(12) United States Patent
Ohashi

(10) Patent No.: US 11,556,295 B2
(45) Date of Patent: Jan. 17, 2023

(54) INFORMATION PROCESSING APPARATUS, NON-TRANSITORY COMPUTER READABLE MEDIUM, AND INFORMATION PROCESSING METHOD

(71) Applicant: FUJIFILM BUSINESS INNOVATION CORP., Tokyo (JP)

(72) Inventor: Yuji Ohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/374,144

(22) Filed: Jul. 13, 2021

(65) Prior Publication Data

US 2022/0214845 A1   Jul. 7, 2022

(30) Foreign Application Priority Data

Jan. 6, 2021   (JP) .............................. JP2021-000953

(51) Int. Cl.
*G06F 3/12* (2006.01)
*H04L 51/02* (2022.01)
*H04L 51/046* (2022.01)

(52) U.S. Cl.
CPC .......... *G06F 3/1268* (2013.01); *G06F 3/1204* (2013.01); *G06F 3/1287* (2013.01); *H04L 51/02* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 2020/0097221 A1* | 3/2020 | Matsumoto | H04L 51/216 |
| 2020/0099637 A1* | 3/2020 | Kurokawa | G06F 3/1222 |
| 2020/0099642 A1* | 3/2020 | Mishima | G06F 3/1285 |

FOREIGN PATENT DOCUMENTS

| | | |
|---|---|---|
| JP | 2009-066929 A | 4/2009 |
| JP | 2018-077859 A | 5/2018 |

\* cited by examiner

*Primary Examiner* — Frantz Bataille
(74) *Attorney, Agent, or Firm* — Oliff PLC

(57) ABSTRACT

An information processing apparatus includes: a processor configured to: post request information requesting a proxy printing of a print object through a talk room when a chatbot controlled by the processor receives a request for the proxy printing of the print object posted in the talk room by a requester; and output the print object to an image forming apparatus as a print object of a proxy who accepts the proxy printing of the print object through the talk room to which the request information is posted.

20 Claims, 17 Drawing Sheets

FIG. 2
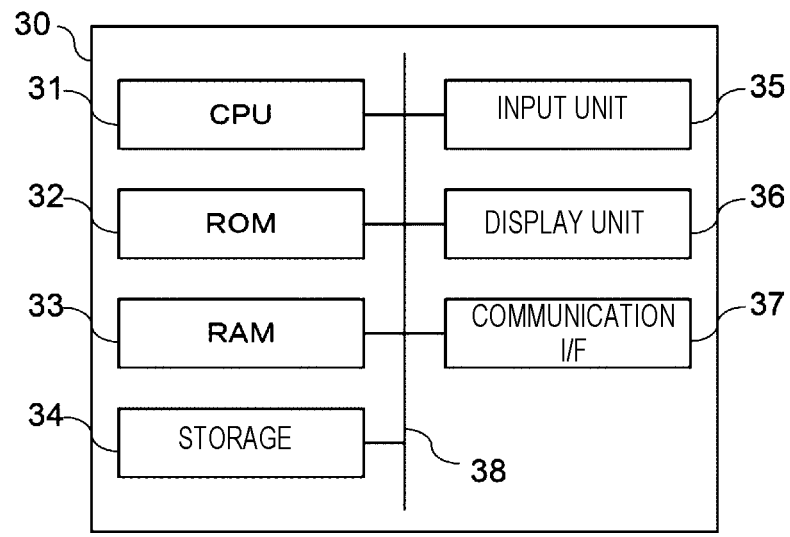
FIG. 3
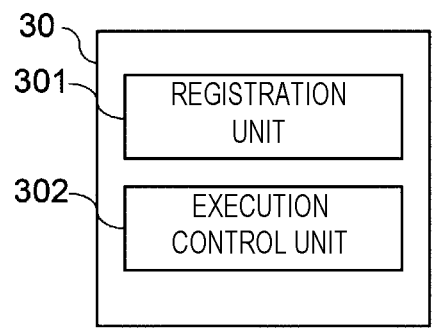
FIG. 4
| USER NAME | CHAT USER ID | PRINT USER ID | 2 |
|---|---|---|---|
| MR. A | UserA | FX01 | |
| MR. B | UserB | FX02 | |
| MR. C | UserC | FX03 | |
| MR. D | UserD | FX04 | |
| ⋮ | ⋮ | ⋮ | |

| PRINT ATTRIBUTE | ATTRIBUTE VALUE |
|---|---|
| PRINT USER ID | FX01 |
| COLOR | COLOR |
| PRINTING SURFACE | ONE-SIDE |
| NUMBER OF COPIES | 1 COPY |
| FILE NAME | minutes.txt |
| ⋮ | ⋮ |

*FIG. 13*

| GROUP ID | CHAT USER ID | |
|---|---|---|
| GROUP A | UserA、UserB、UserC | ~6 |
| GROUP B | UserA、UserB、UserC、UserD、UserE | |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2021-000953 filed Jan. 6, 2021.

BACKGROUND

(i) Technical Field

The present disclosure relates to an information processing apparatus, a non-transitory computer readable medium, and an information processing method.

(ii) Related Art

JP-A-2018-077859 discloses an output system in which a terminal device, an output device, and one or more information processing apparatuses are connected to each other via a network. The output system includes: a registration processing unit of registering an output request for output target data received from the terminal device operated by a registered user; a selection receiving unit of displaying information on the registered user who has set the output user as a substitute user in the output device operated by the output user and accepts a selection of the registered user from the output user; an output request providing unit of receiving a request for acquiring an output request for the output target data of the registered user selected by the output user from the output device, and providing the output request of the output target data on the registered user selected by the output user to the output device; and an output processing unit of receiving a selection of an output request for the output target data from the output user in the output device, acquiring the output target data of the output request for which the selection is received from a storage destination, and outputting the output target data.

JP-A-2009-066929 discloses a printing apparatus that includes: a notification unit of notifying a user of the existence of a request print job, which is a print job set to wait for printing by any of the designated proxies; a receiving unit of receiving a print job from an external terminal; a storage unit of storing the requested print job; a user authentication unit of authenticating the user; a printing unit of printing based on the print job; and a control unit of storing the requested print job in the storage unit and suspending the execution of printing when the print job received from the external terminal by the receiving unit is the requested print job, checking whether the requested print job with the authenticated user as one of the proxies is stored in the storage unit on the condition that the user is authenticated by the user authentication unit, and when the requested print job is stored, controlling the existence of the requested print job to notify the user by the notification unit.

SUMMARY

Accompanied with the recent work style reform, the number of users who work from home is increasing more than before. In the case of working from home, for example, when the user's computer and the computer in the company are connected by a communication line, the company information may be accessed from a remote location, so that the company's business may be performed regardless of the user's location.

However, for example, when the contents of a file need to be printed on paper for distribution in-house as a material, the file to be printed needs to be sent by e-mail or stored in a file server to request that someone in the company perform a proxy printing of the print object.

It would be nice if a person who can perform the proxy printing of the print object may be found immediately, but due to the circumstances of the other party, it may not be possible to find the user who performs the proxy printing immediately. In this case, the requester requesting proxy printing needs to contact several users.

Even for the user who receives the proxy printing request, a series of jobs occurs including acquiring the file from the requester, starting an application corresponding to the file type and performing the printing. When the printing is completed by an image forming apparatus, a job of notifying the requester that the printing is completed occurs at the user side.

Aspects of non-limiting embodiments of the present disclosure relate to an information processing apparatus, a non-transitory computer readable medium, and an information processing method capable of reducing the amount of work required for a user who has received a request for proxy printing to print a print object with an image forming apparatus, and for the requester, as compared with the case where the requester directly requests the user who may be available for the proxy printing of the print object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: post request information requesting a proxy printing of a print object through a talk room when a chatbot controlled by the processor receives a request for the proxy printing of the print object posted in the talk room by a requester; and output the print object to an image forming apparatus as a print object of a proxy who accepts the proxy printing of the print object through the talk room to which the request information is posted.

BRIEF DESCRIPTION OF THE DRAWINGS

Exemplary embodiment(s) of the present disclosure will be described in detail based on the following figures, wherein:

FIG. 2 is a block diagram illustrating a hardware configuration example of a chatbot server;

FIG. 3 is a block diagram illustrating a functional configuration example of the chatbot server;

FIG. 4 is a diagram illustrating an example of registration information;

FIG. 13 is a diagram illustrating an example of group information;

DETAILED DESCRIPTION

Figure 1:
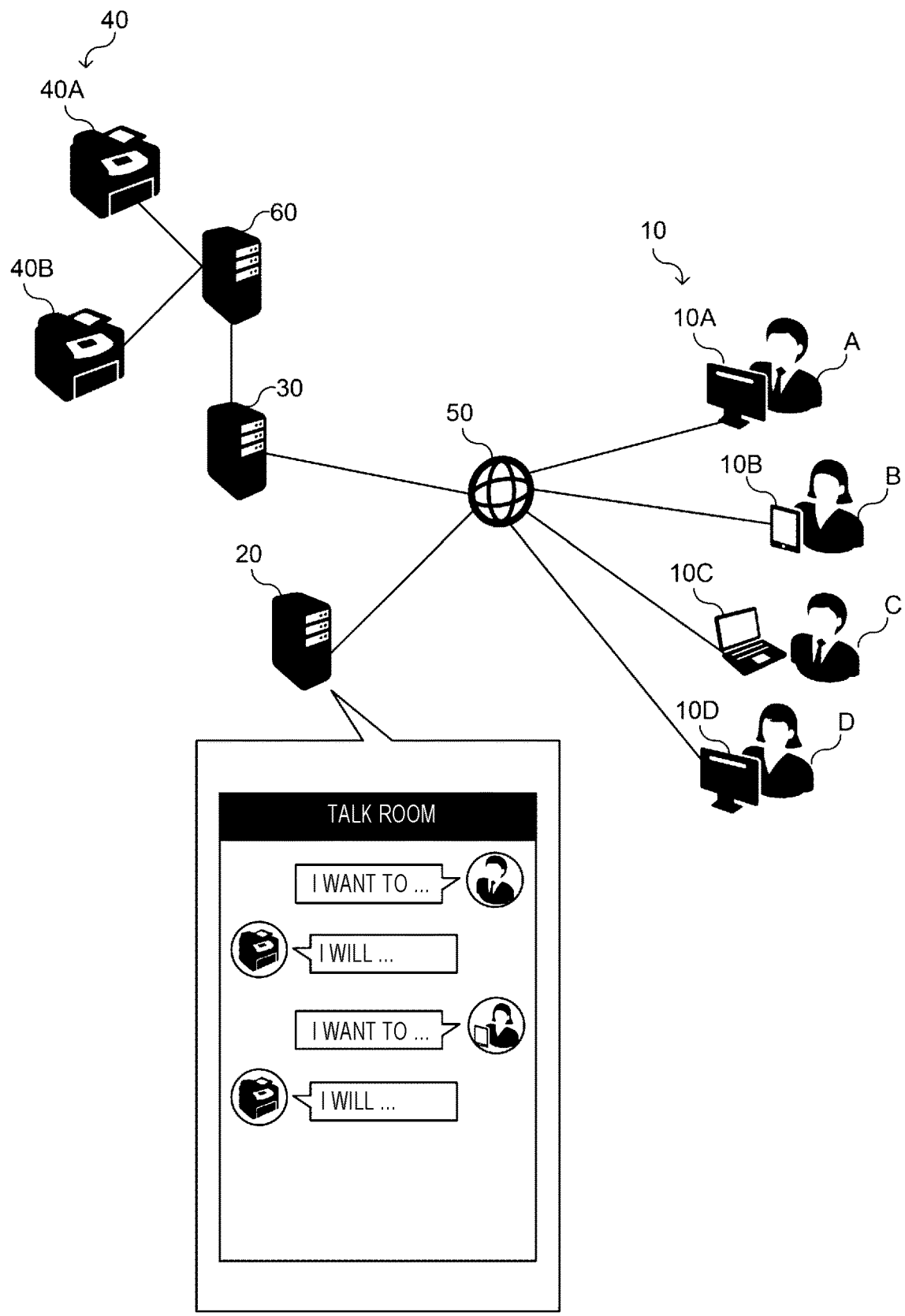
FIG. 1 is a diagram illustrating a schematic configuration example of an information communication system.

Hereinafter, the present exemplary embodiment will be described with reference to the accompanying drawings. The same elements and the same processing are given the same reference numerals throughout the drawings, and duplicate descriptions thereof are omitted.

FIG. 1 is a diagram illustrating a schematic configuration example of an information communication system according to an exemplary embodiment.

The information communication system includes a user terminal 10, a talk room server 20, a chatbot server 30, a printer 40, and a printer server 60. The user terminal 10, the talk room server 20, and the chatbot server 30 are connected to each other by the Internet 50. The chatbot server 30, the printer server 60, the printer 40, and the printer server 60 are each connected by a communication line such as a local area network (LAN).

The user terminal 10 is a terminal used by the user and may be any terminal such as a desktop computer, a laptop computer, a tablet, or a smartphone. In FIG. 1, it is assumed that a user A uses a user terminal 10A, a user B uses a user terminal 10B, a user C uses a user terminal 10C, and a user D uses a user terminal 10D. Further, there is no limitation on the number of user terminals 10 included in the information communication system, and the user terminals 10 used by other users such as a user E and a user F (not illustrated) may be included. Plural user terminals 10 including the user terminals 10A to 10D are collectively referred to as a "user terminal 10".

The printer 40 is an example of an image forming apparatus that forms an image on a recording medium such as paper, and is used by a user for printing a print object. At least one or more printers 40 are connected to the printer server 60. In the example of the information communication system of FIG. 1, a printer 40A and a printer 40B are connected to the printer server 60, but there is no limitation on the number of printers 40 connected to the printer server 60. Hereinafter, plural printers 40 including the printer 40A and the printer 40B will be collectively referred to as a "printer 40".

There are no limitations on the installation place of the user terminal 10, but, as an example, it is here assumed that the user terminal 10 is installed in the company where the printer 40 is installed and in the user's home. That is, each user is classified into a user who goes to work at a company and a user who works from home. There are no limitations on the installation place of the chatbot server 30 and the printer server 60. For example, the chatbot server 30 and the printer server 60 may be installed in a company or in a data center using a cloud service.

The talk room server 20 provides a talk room. The talk room is a virtual space in which at least one user and a chatbot described later may participate and share information represented by a message posted by chat.

Here, a "message" is a unit of data representing a type of information, and a "chat" refers to an environment in which plural members input and exchange information in real time on a computer network, or an environment provided to do so. A "member" includes both a user associated with a real person and a software robot that operates according to specific rules. Further, the "chatbot" is a software robot that performs a control so that a specific process (hereinafter, referred to as a "specific process") is executed based on the information posted by the user in the talk room.

The user may post a message in the talk room through the user terminal 10. Here, the phrase "post a message" means an act of disclosing information through the talk room to other users who participate in the talk room.

The message includes, for example, images and characters, as well as a file that is a collection of data. Therefore, the phrase "post a message" also means an act of inputting various instructions and information represented by files, images, and characters and disclosing such instructions and information in the talk room.

In the talk room, users may share information represented by messages, and chatbot may respond to and answer the user information. In addition, the user may give an instruction to the chatbot to execute a specific process in the talk room. The chatbot extracts the instruction included in the message posted by, for example, natural language processing and executes a specific process. In the talk room, a user and a chatbot may participate one-on-one, or plural users and a chatbot may participate.

Hereinafter, a chat in which only one user and a chatbot participate in a talk room is referred to as an "individual chat", and a chat in which plural users and a chatbot participate in a talk room is referred to as a "group chat". Further, the talk room where the individual chat is performed is called an "individual talk room", and the talk room where the group chat is performed is called a "group talk room". There may be as many talk rooms as the talk rooms created.

The chatbot server 30 is a server that manages chatbots, and is an example of an information processing apparatus according to the exemplary embodiment. As described above, the chatbot participates in the talk room, responds to the message posted by the user, and executes the specific process according to the instruction contained in the message.

For example, when any user gives an instruction for proxy printing to the chatbot, the chatbot instructs another user different from the user who requests the proxy printing (referred to as a "requester") to receive the print object instructed by the requester on behalf of the requester by the printer 40. Such proxy printing of a print object is an example of specific process performed by the chatbot server 30 through the chatbot.

In the example of the information communication system of FIG. 1, the printer server 60 is connected to the chatbot server 30, but the printer server 60 may be connected to the chatbot server 30 via the Internet 50.

Next, the hardware configuration of the chatbot server 30 will be described.

FIG. 2 is a block diagram illustrating a hardware configuration example of the chatbot server 30. As illustrated in FIG. 2, the chatbot server 30 is configured with a computer, and includes a central processing unit (CPU) 31, a read only memory (ROM) 32, a random access memory (RAM) 33, a storage 34, an input unit 35, a display unit 36, and a communication interface (I/F) 37. The respective elements are communicably connected to each other through a bus 38.

The CPU 31 functions as a control unit that executes various programs including an information processing program and controls the respective units thereof. That is, the CPU 31 reads the information processing program from the ROM 32 or the storage 34, and executes the information processing program that performs the specific process by using the RAM 33 as a work area. In the present exemplary embodiment, it is assumed that the information processing program that defines the operation of the specific process is stored in the ROM 32.

The ROM 32 stores various programs including an information processing program and various data. The RAM 33 temporarily stores various programs including an information processing program and various data as a work area. The storage 34 is configured with a hard disk drive (HDD) or a solid state drive (SSD), and stores various programs including an operating system and various data.

The input unit 35 includes a pointing device such as a mouse and a keyboard, and is used to perform various inputs.

The display unit 36 is, for example, a liquid crystal display and displays various information. The display unit 36 may adopt a touch panel method and function as an input unit 35. The communication I/F 37 is an interface for communicating with other devices through the Internet 50, and includes a communication protocol for performing a data communication on the Internet 50.

Next, the functional configuration of the chatbot server 30 will be described.

FIG. 3 is a block diagram illustrating a functional configuration example of the chatbot server 30. As illustrated in FIG. 3, the chatbot server 30 includes a registration unit 301 and an execution control unit 302 as functional configurations. Each functional configuration is implemented by the CPU 31 reading the information processing program stored in the ROM 32, expanding the information processing program in the RAM 33, and executing the program.

For example, the registration unit 301 registers, deletes, and updates information (referred to as "registration information 2") associated with a user name, a chat user ID, and a print user ID for each user who is a communication partner of the chatbot.

Here, the user name is the name of the user displayed in the talk room.

The chat user ID is identification information used inside the specific process by the chatbot server 30 in order to uniquely identify a user who participates in the talk room. The user name is the identification information set by the user who uses the talk room provided by the talk room server 20, and the chat user ID is the identification information set by the talk room server 20 for the user who uses the talk room. The chat user ID is an example of first identification information according to the present exemplary embodiment.

In order for a user and a chatbot to participate in the same talk room and exchange messages, an initial registration is required to register each other's user names and chat user IDs, as will be described later. The registration unit 301 acquires the user name and the chat user ID for each user who has performed the initial registration with the chatbot from the talk room server 20.

The print user ID is identification information used to uniquely identify a user who uses the printer 40, and is an example of second identification information according to the present exemplary embodiment.

When outputting a print object from the printer 40, the user inputs his/her own print user ID into the printer 40. The printer 40 acquires print data associated with the print user ID stored in the printer server 60, and prints the acquired print data on a recording medium to output the recording medium with the print data printed thereon. Therefore, in order to output the print object of another user on the printer 40, the user needs to input the print user ID of the other user into the printer 40, but from the viewpoint of security, the print user ID for each user is not disclosed. Therefore, the registration unit 301 acquires the print user ID from the chatbot and the user who has been initially registered.

In this way, the registration unit 301 registers the acquired user name, chat user ID, and print user ID in the registration information 2 in association with each user. FIG. 4 is a diagram illustrating an example of registration information 2.

Further, the registration unit 301 registers the identification information (e.g., IP address) of the printer server 60 in order to transmit the print data received by the chatbot server 30 through the chatbot to the printer server 60.

Such registration information 2 and identification information of the printer server 60 are stored in the storage 34, but the registration unit 301 may be stored in a storage area of an external device (not illustrated) connected to the Internet 50.

The execution control unit 302 causes the chatbot to participate in the talk room, controls the chatbot to notify the user of various messages, and executes a specific process according to the user's response to the chatbot message and the contents of the message posted in the talk room by the user.

First Exemplary Embodiment

Next, the operation of the chatbot server 30 according to the first exemplary embodiment will be described.

Figure 5:
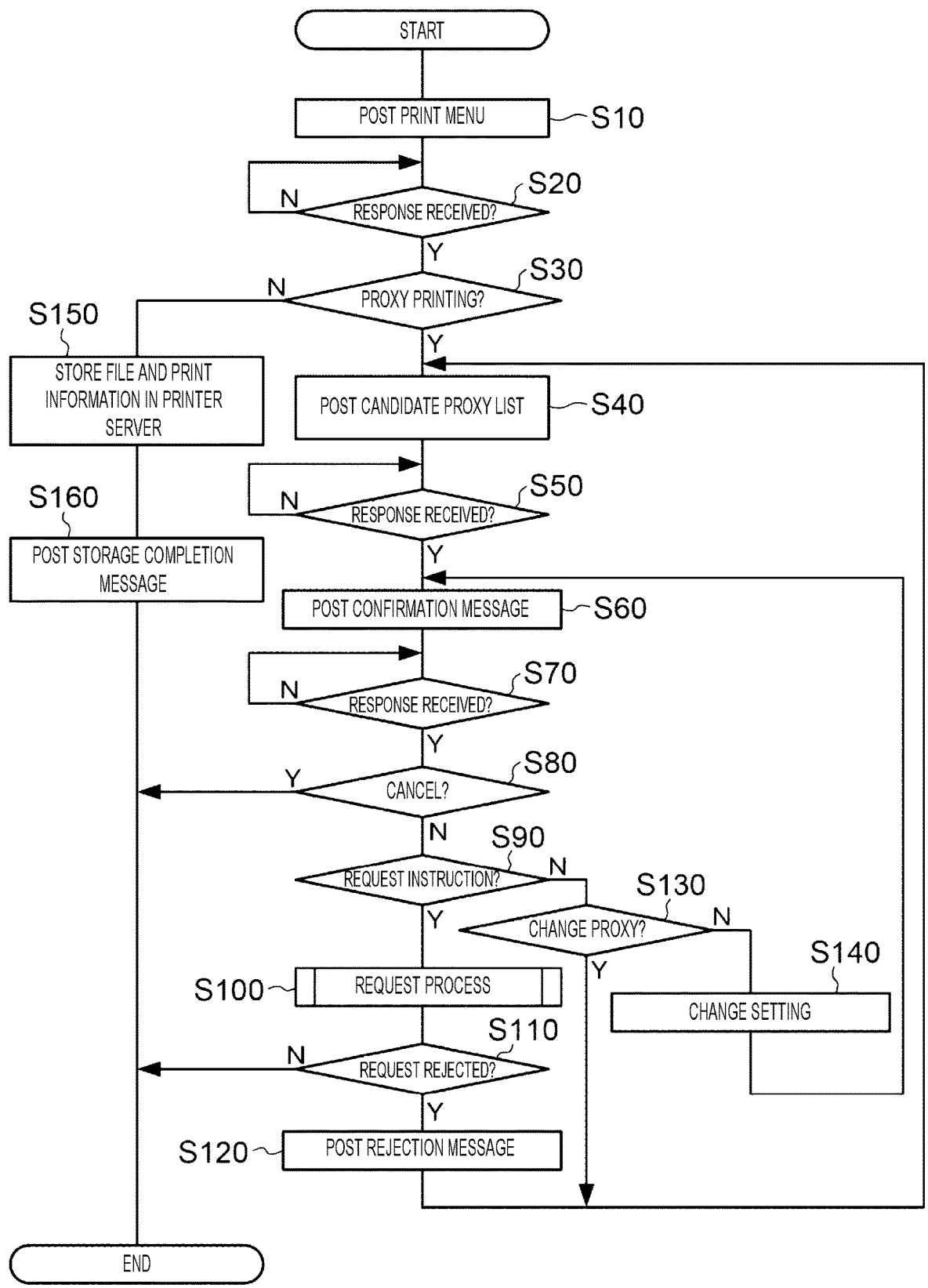
FIG. 5 is a flowchart illustrating an example of the flow of a proxy printing process according to a first exemplary embodiment.

FIG. 5 is a flowchart illustrating an example of a flow of a proxy printing process executed by the CPU 31 when print data is posted to an individual talk room in which the chatbot server 30 participates through the chatbot. Further, FIG. 6 is a diagram illustrating an example of a talk room displayed on the user terminal 10 of the requester who posts the print data by the proxy printing process illustrated in FIG. 5.

The information processing program that defines the proxy printing process illustrated in FIG. 5 is stored in advance in, for example, the ROM 32 of the chatbot server 30. The CPU 31 of the chatbot server 30 reads the information processing program stored in the ROM 32 and executes the proxy printing process.

It is assumed that the initial registration has already been completed for the requester for proxy printing and the chatbot. In addition, the user name of the requester for proxy printing is "Mr. B" for convenience of explanation.

Figure 6:
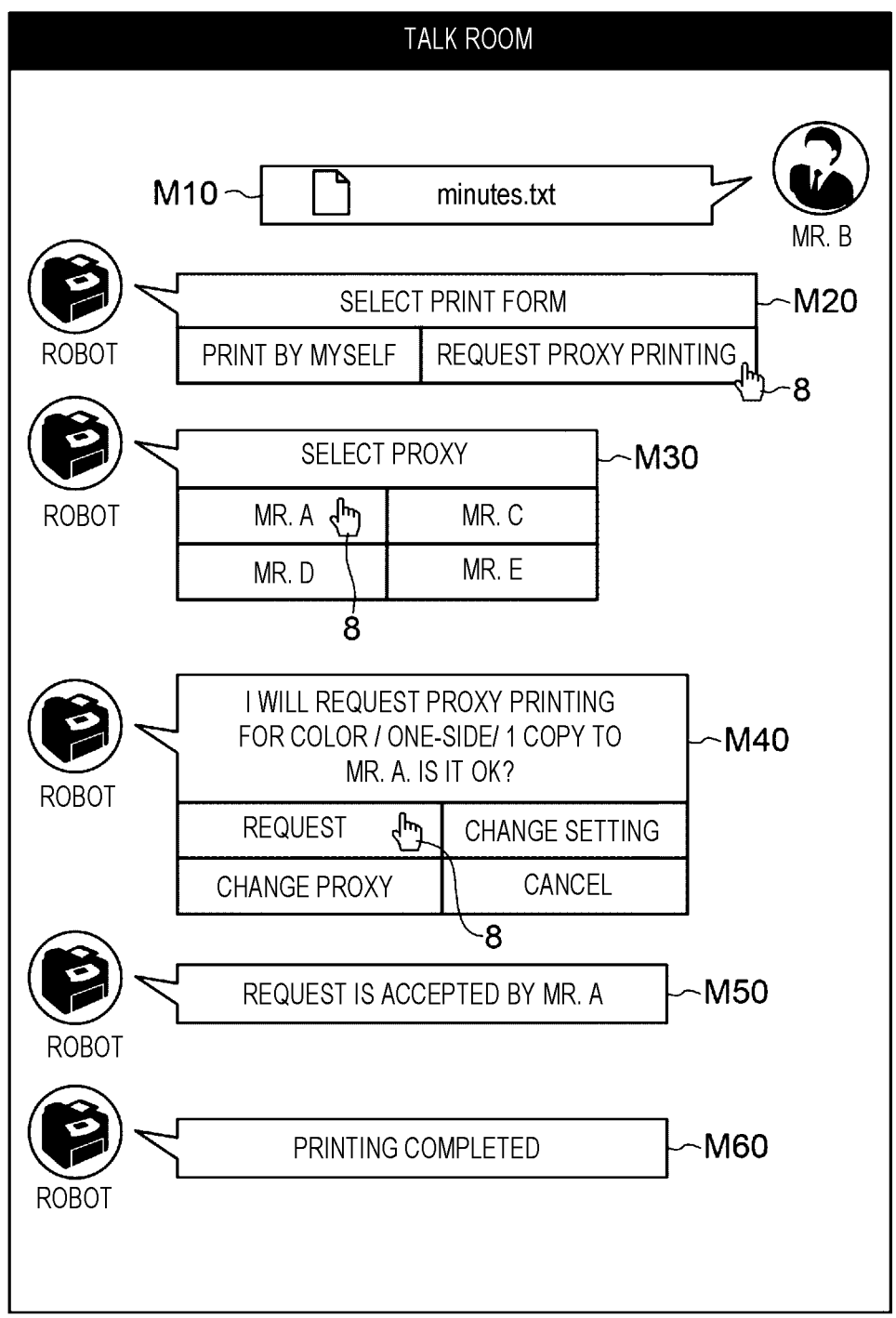
FIG. 6 is a diagram illustrating an example of a talk room when the proxy printing process according to the first exemplary embodiment is performed.

As illustrated in FIG. 6, when the requester posts a print object file named "minutes.txt", which is an example of print data, to the talk room as a message M10, in step S10 of FIG. 5, the CPU 31 posts the print menu (see the message M20 of FIG. 6) to the talk room.

The print menu is a menu that allows the requester to select the print form of the file, and includes, for example, two options of "print by myself" and "request proxy printing".

The requester selects one of the options in the print menu and responds to the chatbot selection instruction.

In step S20, the CPU 31 determines whether the requester's response to the print menu has been received. When it is determined that the response has not been received, the determination process of step S20 is repeatedly executed to monitor the presence or absence of the response. When it is determined that any response has been received, the process proceeds to step S30.

In step S30, the CPU 31 determines whether the received response is a response corresponding to the proxy printing request, which is received when "request proxy printing" is selected from the print menu by the requester. When it is determined that the response corresponding to the proxy printing request has been received, the process proceeds to step S40.

In FIG. 6, a hand-shaped mark 8 indicates that the requester has selected an option that overlaps with the mark 8. That is, the example of FIG. 6 represents that the requester has selected "request proxy printing" for the print menu indicated by the message M20. Therefore, the mark 8 is not displayed in the talk room.

In step S40, the CPU 31 posts a candidate proxy list (see the message M30 in FIG. 6) including candidates for a user (referred to as a "proxy") who prints the file on behalf of the requester to the talk room.

The candidate proxy list is a list that allows the requester to select a proxy candidate, and includes, for example, the user name of the user registered in the registration information 2. That is, the candidate proxy list includes the user name of the user whose initial registration with the chatbot is completed and which is stored in the storage 34 in advance as a partner with whom the chatbot may communicate in the talk room. Hereinafter, the candidate for the proxy is simply referred to as a "candidate".

The requester selects one of the user names included in the candidate proxy list and responds to the chatbot selection instruction.

In step S50, the CPU 31 determines whether the requester's response to the candidate proxy list has been received. When it is determined that the response has not been received, the determination process of step S50 is repeatedly executed to monitor the presence or absence of a response. When it is determined that any response has been received, it means that the requester has selected the candidate. Thus, the process proceeds to step S60.

In step S60, the CPU 31 acquires the user name of the candidate selected by the requester and posts a confirmation message (see the message M40 in FIG. 6) to the talk room.

The confirmation message is information that asks the requester to confirm the print setting of the file and the user name of the candidate who is requested to perform the proxy printing, and includes, for example, "request", "change setting", "change the proxy", and "cancel" options.

In response, the requester selects one of the confirmation message options and responds to the chatbot selection instruction.

In step S70, the CPU 31 determines whether the requester's response to the confirmation message has been received. When it is determined that no response has been received, the determination process of step S70 is repeatedly executed to monitor the presence or absence of a response. When it is determined that any response has been received, the process proceeds to step S80.

In step S80, the CPU 31 determines whether the received response is a response corresponding to cancellation, which is received when "cancel" of the confirmation message is selected by the requester. When it is determined that the response corresponding to cancellation has been received, the requester instructs to cancel the proxy printing process. Thus, the proxy printing process illustrated in FIG. 5 is ended.

When it is determined that the received response is not a response corresponding to cancellation, the process proceeds to step S90.

In step S90, the CPU 31 determines whether the received response is a response corresponding to the request instruction, which is received when "request" of the confirmation message is selected by the requester. When it is determined that the response does not correspond to the request instruction, the process proceeds to step S130.

In step S130, the CPU 31 determines whether the received response is a response corresponding to the change of proxy, which is received when "change proxy" of the confirmation message is selected by the requester. When it is determined that the response corresponding to the change of proxy has been received, since the requester wants to change the candidate selected in the candidate proxy list, the process proceeds to step S40, and the candidate proxy list is posted to the talk room again.

When it is determined that the received response is not a response corresponding to the change of proxy, the requester has selected "change setting" from the confirmation message. Therefore, the process proceeds to step S140, and in step S140, the CPU 31 changes the attribute value of the print attribute that defines the print operation of the printer 40.

In the confirmation message represented by the message M40 of FIG. 6, for example, for each printing attribute of color, printing surface, and number of copies, color, cross-section, and attribute values of one copy are set. When the requester posts the print attribute and attribute value to be changed, for example, "color: black and white" to the talk room, the CPU 31 changes the designated print attribute to the designated attribute value, proceeds to step S60, and posts a confirmation message reflecting the change in the attribute value to the talk room again.

When it is determined in the determination process of step S90 that the received response is a response corresponding to the request instruction, the process proceeds to step S100.

In step S100, the CPU 31 executes a request process of requesting the candidate selected from the candidate proxy list by the requester to print the file posted in the talk room by the requester on behalf of the candidate. As will be described in detail later, in the request process, when the candidate accepts a request for proxy printing from the requester, an acceptance message (see the message M50 in FIG. 6) notifying the requester that the candidate accepts the proxy printing as a proxy is posted in the talk room.

The CPU 31 stores the file posted in the talk room by the requester as a file of the candidate who accepts the request for proxy printing, that is, the proxy, in the printer server 60. When the proxy receives a recording medium on which the contents of the file are printed on the printer 40, a completion message (see the message M60 in FIG. 6) notifying the requester that the proxy printing is completed is posted to the talk room.

However, in the request process, the candidate may reject the request for proxy printing due to circumstances. Therefore, in step S110 after executing the request process, the CPU 31 determines whether the candidate rejects the request for proxy printing in the request process. When the candidate accepts the request for proxy printing, in the request process in step S100, the proxy printing of the file posted in the talk room by the requester is performed by the proxy, so that the proxy printing process illustrated in FIG. 5 is ended.

When it is determined that the candidate rejects the request for proxy printing, the process proceeds to step S120.

In step S120, the CPU 31 posts a rejection message to the talk room indicating that the candidate selected by the requester has rejected the proxy printing request. This allows the requester to know through the chatbot that the selected candidate has rejected the proxy printing request.

After that, the CPU 31 proceeds to step S40 in order to cause the requester to select a new candidate, and posts the candidate proxy list to the talk room again. That is, the CPU 31 requests the candidate selected from the candidate proxy list for proxy printing until the requester selects "cancel" for the confirmation message.

Further, since the requester selects "print by myself" for the print menu posted to the talk room by the CPU 31 in step S10, when it is determined in the determination process of step S30 that the received response is not a response corresponding to the request for proxy printing, the process proceeds to step S150. In this case, the requester directly moves to the printer 40 and instructs the requester to perform a normal printing such that the requester receives a recording medium on which the contents of the file posted in the talk room are printed.

Therefore, in step S150, the CPU 31 associates the requester's print user ID (in this case, "FX02") with the file posted in the talk room by the requester to generate print information 4. Then, the CPU 31 outputs the file and the generated print information 4 to the printer server 60, and stores the print information 4 in the printer server 60. Surely, the CPU 31 may cause the requester to confirm the currently set print setting and accept the change of the print setting from the requester. The details of the print information 4 will be described later.

Since the print information 4 has been stored in the printer server 60, in step S160, the CPU 31 posts a storage completion message to the talk room and ends the proxy printing process illustrated in FIG. 5. The storage completion message is a message notifying that the file posted in the talk room can be printed by the printer 40. In this case, the requester moves to the printer 40 and inputs his/her print user ID into the printer 40, so that the requester directly receives a recording medium on which the contents of the file are printed by the printer 40.

Next, the details of the request process executed in step S100 will be described.

Figure 7:
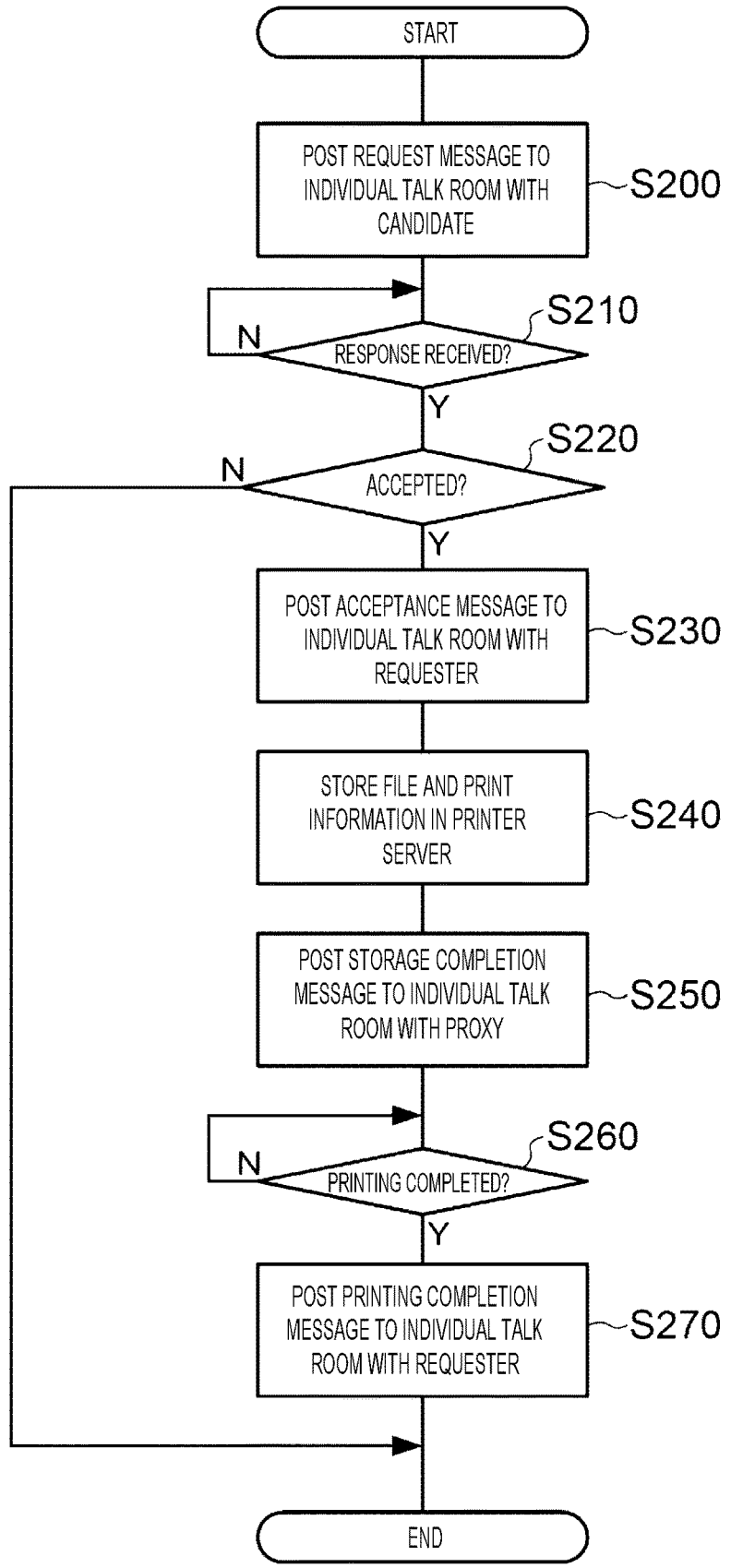
FIG. 7 is a flowchart illustrating an example of the flow of a request process in the proxy printing process according to the first exemplary embodiment.
Figures 8, 9:
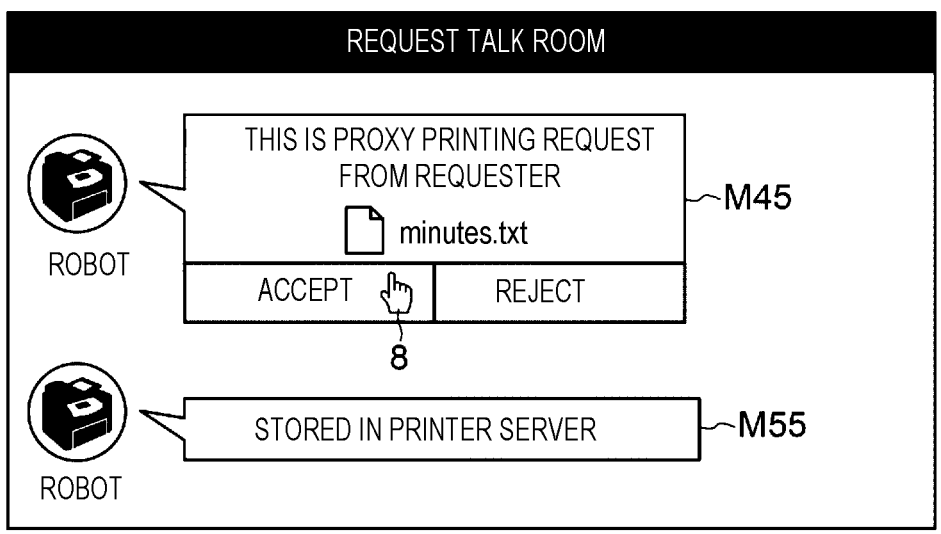
FIG. 8 is a diagram illustrating an example of a talk room displayed on a user terminal of a user who is a request destination for proxy printing.
FIG. 9 is a diagram illustrating an example of print information.

FIG. 7 is a flowchart illustrating an example of a flow of the request process executed by the CPU 31 in step S100 of FIG. 5. Further, FIG. 8 is a diagram illustrating an example of a request talk room displayed on the user terminal 10 of the user who is a request destination for proxy printing in the request process illustrated in FIG. 7. Here, as an example, the user name of the candidate selected by the requester is "Mr. A".

First, in step S200, the CPU 31 does not post a request message (see the message M45 in FIG. 8) to a talk room in which the requester and the chatbot are individually chatting, but posts to another talk room in which the candidate and the chatbot selected by the requester are individually chatting, that is, a request talk room.

The request message is a message that allows the candidate to select whether to accept the request for proxy printing from the requester, and is an example of the request information. The request message includes, for example, "accept" and "reject" options.

The candidate selects one of the options in the request message and responds to the chatbot's selection instruction.

In step S210, the CPU 31 determines whether the candidate's response to the request message has been received. When it is determined that no response has been received, the determination process of step S210 is repeatedly executed to monitor the presence or absence of a response. When it is determined that any response has been received, the process proceeds to step S220.

In step S220, the CPU 31 determines whether the received response is a response corresponding to acceptance, which is received when "accept" of the request message is selected by the candidate. When it is determined that the response corresponding to the acceptance has been received, it means that the candidate has received the request for proxy printing from the requester. Thus, the process proceeds to step S230. When the candidate accepts the request for proxy printing from the requester, the candidate acts as the requester's proxy.

In step S230, the CPU 31 posts an acceptance message informing the requester that the candidate has accepted proxy printing as a proxy to the talk room in which the requester and the chatbot are individually chatting. As a result, the message M50 of FIG. 6 described above is displayed in the talk room where the requester and the chatbot are individually chatting.

In step S240, the CPU 31 generates print information 4 in which the print user ID of the proxy and the print settings confirmed by the requester by the confirmation message are associated with the file posted in the talk room by the requester.

FIG. 9 is a diagram illustrating an example of print information 4 generated by the CPU 31. The print information 4 includes an attribute value for each print attribute. The print attribute includes, for example, a print user ID representing the owner of the file to be printed and the file name of the file to be printed, in addition to the print settings confirmed by the requester in the confirmation message.

The CPU 31 sets the print user ID of the user who prints the file represented by the file name ("minutes.txt"), not as the print user ID ("FX02") of Mr. B who is the requester, but as the print user ID of Mr. A who is the proxy ("FX01"). That is, the CPU 31 sets the file to be printed to the file of the proxy, not the file of the requester.

Then, the CPU 31 outputs the file and the print information 4 to the printer server 60, and stores the file and the print information 4 in the printer server 60.

Along with this, in step S250, the CPU 31 posts a storage completion message (see the message M55 in FIG. 8) to the request talk room.

By the storage complete message, the proxy confirms that the file is ready for printing. After confirming that the file is ready to be printed, the proxy moves to the printer 40, inputs the proxy's own print user ID (in this case, "FX01") to the printer 40, and receives a recording medium on which the contents of the file are printed on the printer 40 on behalf of the requester.

When the file is printed by the printer 40, the printer server 60 sends a response to the chatbot server 30 notifying that the printing of the file is completed.

Therefore, in step S260, the CPU 31 determines whether the response notifying that the printing of the file is completed has been received. When it is determined that no response has been received, the determination process of step S260 is repeatedly executed to monitor the presence or absence of a response. When it is determined that the response has been received, the process proceeds to step S270.

In response to the completion of file printing, in step S270, the CPU 31 posts a completion message (see the message M60 in FIG. 6) notifying the requester that the proxy printing is completed to the talk room in which the requester and the chatbot are individually chatting, and ends the request process illustrated in FIG. 7.

When it is determined in the determination process of step S220 that the candidate has rejected the request for proxy printing from the requester, the request process illustrated in FIG. 7 is ended without executing the processes of steps S230 to S270. In this case, the CPU 31 posts a message notifying that the candidate has rejected the request for proxy printing to the talk room where the requester and the chatbot are individually chatting, and ends the request process illustrated in FIG. 7.

As described above, according to the proxy printing process illustrated in FIG. 5, since the chatbot requests other users to perform a proxy printing on behalf of the requester, the troublesomeness associated with the proxy printing request is reduced as compared with the case where the requester directly requests other users to perform the proxy printing. Further, since the chatbot stores the print information 4 of the file in the printer server 60 in advance, the proxy does not need to perform an operation related to print preparation such as downloading a file to be printed and giving a print instruction to the printer server 60, and may receive a recording medium on which the contents of the file are printed as long as he/she moves to the printer 40. In addition, since the file is treated as the print object of the proxy, it is not necessary for the proxy to tell the requester's print user ID in order to print the file with the printer 40, and from the viewpoint of security, the requester's print user ID, which is confidential information, is not known to the proxy.

Next, the initial registration performed between the user and the chatbot will be described.

Figure 10:
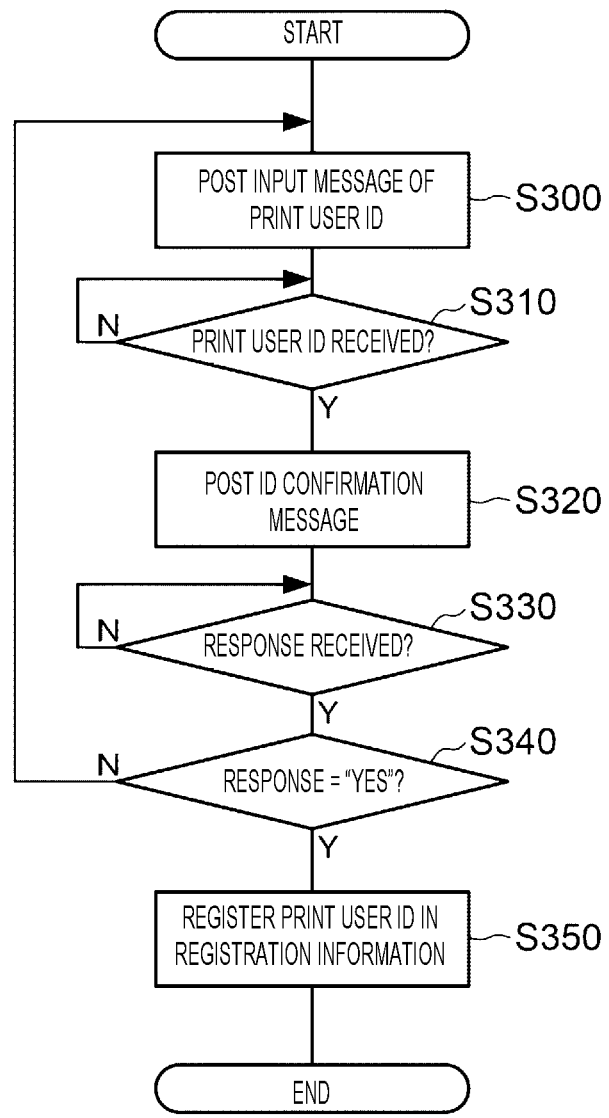
FIG. 10 is a flowchart illustrating an example of the flow of an initial registration process.
Figure 11:
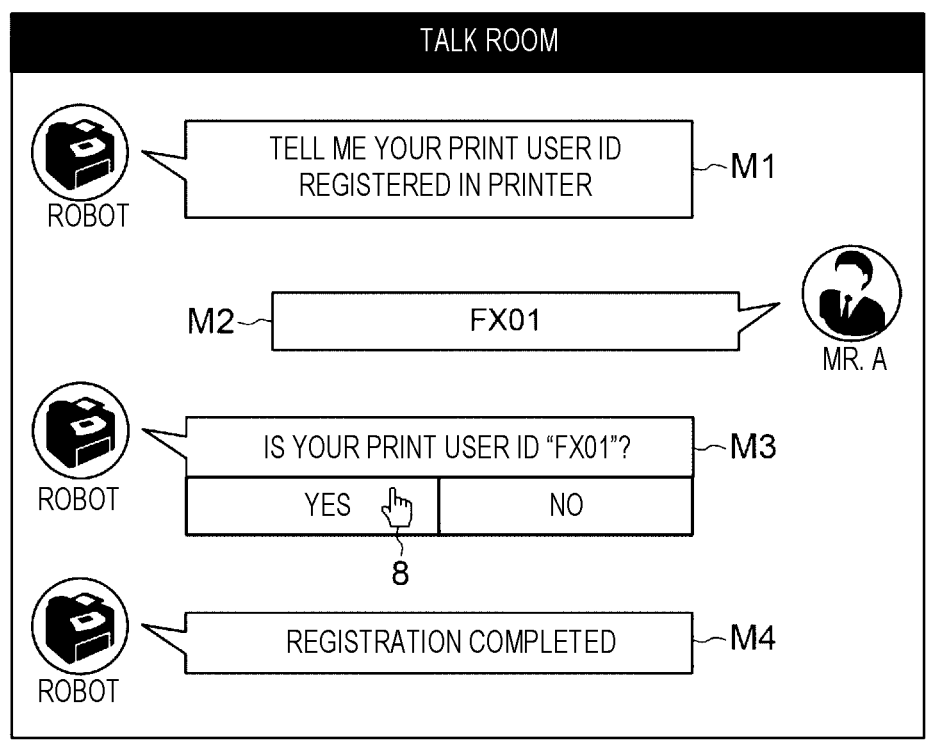
FIG. 11 is a diagram illustrating an example of a talk room when the initial registration process is performed.

FIG. 10 is a flowchart illustrating an example of the flow of the initial registration process executed by the CPU 31. Further, FIG. 11 is a diagram illustrating an example of a talk room displayed on the user terminal 10 of the user who performs the initial registration with the chatbot by the initial registration process illustrated in FIG. 10.

The initial registration process is a process executed when the user and the chatbot exchange messages for the first time in the talk room.

Similar to the proxy printing process illustrated in FIG. 5, the processing content of the initial registration process illustrated in FIG. 10 is defined by the information processing program. Therefore, the CPU 31 of the chatbot server 30 reads the information processing program stored in the ROM 32 and executes the initial registration process.

The talk room for initial registration may be an individual talk room of the chatbot and the user, or a group talk room in which the chatbot and plural users participate together. Further, it is assumed that the CPU 31 acquires the user name and chat user ID of the user to be initially registered from the talk room server 20 and stores them in the storage 34. Hereinafter, as an example, the initial registration process will be described using an example of initial registration of a user whose user name is represented by "Mr. A".

In step S300, the CPU 31 posts an input message (see the message M1 in FIG. 11) prompting the user to input the print user ID to the talk room in which the user who performs the initial registration participates.

The user posts his/her print user ID to the talk room (see the message M2 in FIG. 11). When the user is Mr. A, Mr. A will post his print user ID "FX01" to the talk room.

Therefore, in step S310, the CPU 31 determines whether the print user ID has been received from the user. When it is determined that the print user ID has not been received, the determination process of step S310 is repeatedly executed to monitor the posting of the print user ID. When it is determined that the print user ID has been received, the process proceeds to step S320.

In step S320, the CPU 31 posts an ID confirmation message (see the message M3 in FIG. 11) to the talk room in which the user performing the initial registration participates.

The ID confirmation message is information that allows the user to confirm the print user ID posted in the talk room, and includes, for example, "yes" and "no" options for the question as to whether the print user ID posted in the talk room is correct.

In response, the user selects one of the ID confirmation message options to answer the chatbot's question.

Therefore, in step S330, the CPU 31 determines whether the requester's response to the question of the ID confirmation message has been received. When it is determined that the response has not been received, the determination process of step S330 is repeatedly executed to monitor the presence or absence of a response. When it is determined that any response has been received, the process proceeds to step S340.

In step S340, the CPU 31 determines whether the user's response to the ID confirmation message is "yes". When it is determined that the response is "no", since it is necessary to cause the user to post the correct print user ID, the process proceeds to step S300, and the input message is posted again to the talk room in which the user who performs the initial registration participates.

When it is determined that the response is "yes", it means that the user has posted the correct print user ID, and thus, the process proceeds to step S350.

In step S350, the CPU 31 acquires the print user ID that the user has confirmed to be correct, and registers the user name and chat user ID of the user who is performing the initial registration in association with the acquired print user ID in the registration information 2. As a result, the registration information 2 in which the user who is a communication partner of the chatbot is registered is created. Further, the CPU 31 posts a registration completion message (see the message M4 in FIG. 11) notifying the user that the initial registration has been completed to the talk room in which the user performing the initial registration participates.

As a result, the initial setting process illustrated in FIG. 10 is completed.

Modification 1 of First Exemplary Embodiment

In the proxy printing process of FIG. 5 represented in the first exemplary embodiment, each time the candidate selected by the requester rejects the proxy printing request, the requester reselects a new candidate from the candidate proxy list.

In addition, since it is not known when the proxy will indicate the intention to reject the request for proxy printing, and when the request is rejected, the requester needs to check the talk room several times because the request needs to be made to the next candidate.

Therefore, the CPU 31 may accept the request order of the candidates who request the proxy printing from the requester in advance for each candidate included in the candidate proxy list.

Figure 12:
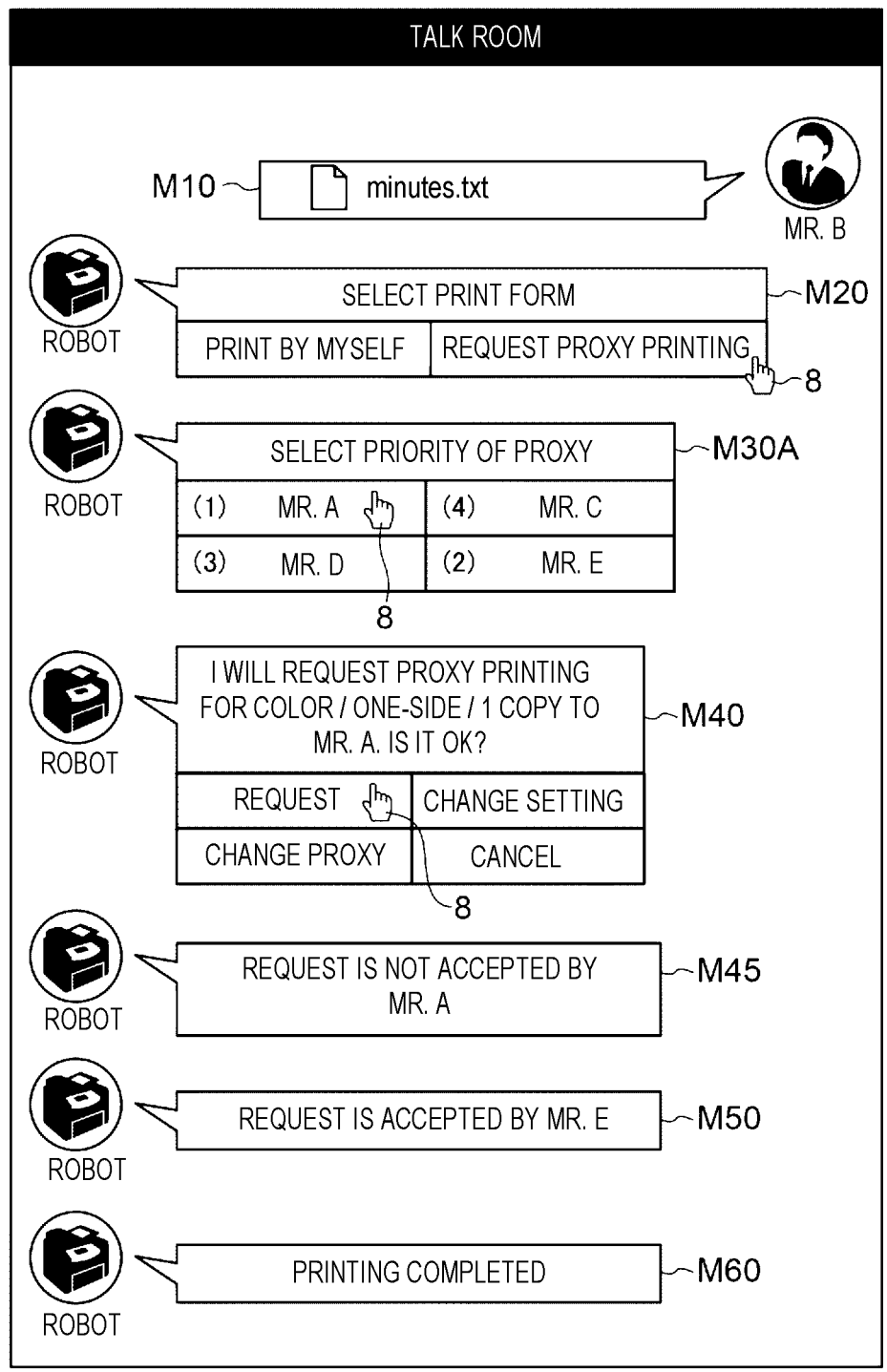
FIG. 12 is a diagram illustrating an example of a talk room when the proxy printing process according to the first exemplary embodiment is performed using a priority candidate proxy list.

Specifically, in step S40 of FIG. 5, the CPU 31 may post the candidate proxy list as illustrated in the message M30A of FIG. 12 to the talk room, instead of the candidate proxy list represented in the message M30 of FIG. 6.

The candidate proxy list (referred to as a "priority candidate proxy list") of FIG. 12 prompts the requester to set the request order of the candidates requesting proxy printing, that is, the priority of the candidates.

The requester sets the priority of the candidates in the order of selecting the user names included in the priority candidate proxy list. In the example of the priority candidate proxy list in FIG. 12, the user names are selected in the order of Mr. A, Mr. E, Mr. D, and Mr. C. The numbers (1) to (4) displayed next to the user names indicate the order in which the user names are selected. As the number given is smaller, the user name is first selected and the priority becomes higher.

In this case, the CPU 31 first requests the user with the highest priority (Mr. A in the example of FIG. 12) for proxy printing, and when the request is rejected, the CPU 31 requests the user with the next highest priority (Mr. E in the example of FIG. 12) for proxy printing without having the requester select the next candidate. In this way, the CPU 31 selects candidates according to the priority of each candidate predetermined by the requester until any candidate included in the priority candidate proxy list accepts the request for proxy printing, and posts a request message to the individual talk rooms of the selected candidate and the chatbot.

In the example of the talk room illustrated in FIG. 12, Mr. A rejects the request for proxy printing (see the message M45), and Mr. E accepts the request (see the message M50).

The requester does not have to set the priority for all the candidates included in the priority candidate proxy list, and may set the priority for the required number of candidates.

Modification 2 of First Exemplary Embodiment

In the proxy printing process of FIG. 5 represented in the first exemplary embodiment, the user name of the user registered in the registration information 2 is included in the candidate proxy list so that the requester may select the candidate. However, as the number of users registered in the registration information 2 increases, it becomes more troublesome for the requester to search for a candidate from plural users.

The talk room is equipped with a group function that divides users into groups and manages each group as a member of group chat.

Therefore, the CPU 31 may acquire group information 6 indicating a correspondence between the groups and the users belonging to each group from the talk room server 20, and post the candidate group list displaying the group ID of the group to which the requester belongs to the talk room where the requester and the chatbot individually chat before posting the candidate proxy list. The group ID is identification information that identifies the group.

FIG. 13 is a diagram illustrating an example of the group information 6. The group information 6 illustrated in FIG. 13 includes group A and group B, and indicates that the chat user ID ("user B") of Mr. B, who is the requester, is included in group A and group B.

Figure 14:
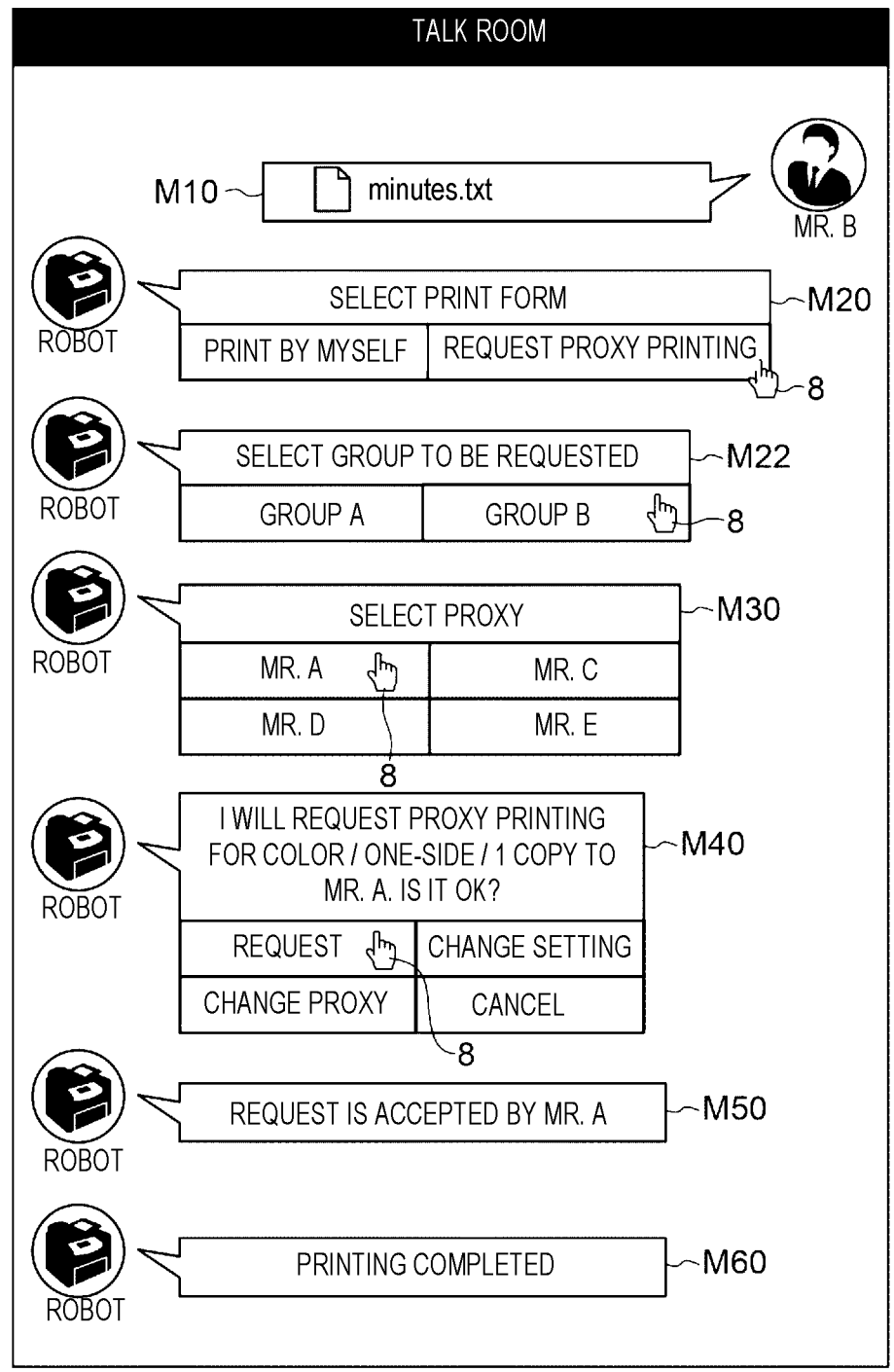
FIG. 14 is a diagram illustrating an example of a talk room when the proxy printing process according to the first exemplary embodiment using a candidate group list is performed.

FIG. 14 is a diagram illustrating an example of a talk room displayed on the user terminal 10 of the requester by the proxy printing process using the candidate group list.

The CPU 31 posts the candidate group list (see the message M22 in FIG. 14) to the talk room before posting the candidate proxy list to the talk room in S40 of FIG. 5.

The candidate group list is a list that causes the requester to select a group to be requested for proxy printing, and among plural groups, the group to which the requester belongs is displayed. When the group information 6 acquired from the talk room server 20 by the CPU 31 is the group information 6 illustrated in FIG. 13, "group A" and "group B" are displayed in the candidate group list represented by the message M22 in FIG. 14.

When the requester selects any group from the candidate group list, the CPU 31 refers to the group information 6 to generate a candidate proxy list including users other than the requester belonging to the group selected by the requester, and posts the generated candidate proxy list to the talk room (see the message M30 in FIG. 14). For example, when the requester selects group B, user names "Mr. A", "Mr. C", "Mr. D", and "Mr. E" corresponding to the chat user IDs of "user A", "user C", "user D", and "user E" belonging to group B, respectively, are displayed as an option in the candidate proxy list.

In this way, when the number of users registered in the registration information 2 is equal to or greater than a predetermined number, the CPU 31 may not display all the users registered in the registration information 2 in the candidate proxy list, but may narrow down the users to be displayed in the candidate proxy list to the group unit selected by the requester and display the users.

Since the requester selects the candidate from the users narrowed down to each group, the requester may select the candidate in a short time as compared with the case of selecting the candidate from all the users registered in the registration information 2.

Further, instead of posting the candidate proxy list to the talk room, the CPU 31 may post the priority candidate proxy list described in modification 1 of the first exemplary embodiment. In this case, the CPU 31 may set the priority of the candidates in the priority candidate proxy list.

Figure 15:
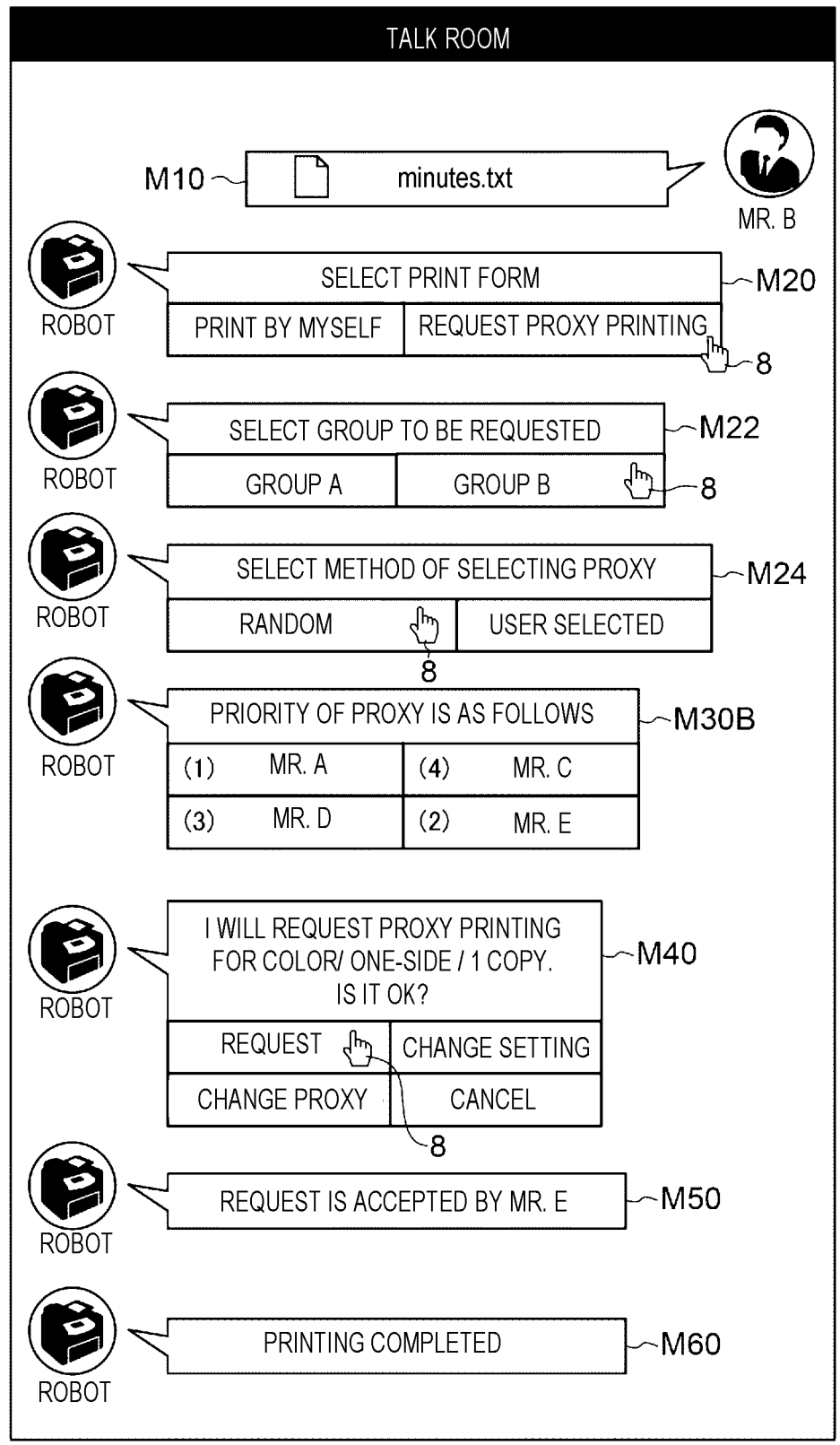
FIG. 15 is a diagram illustrating an example of a talk room when the proxy printing process according to the first exemplary embodiment is performed using a priority selection menu.

FIG. 15 is a diagram illustrating an example of a talk room displayed on the user terminal 10 of the requester by the proxy printing process in which the priority order of the candidates is set by the CPU 31.

After the requester selects a group from the candidate group list (see the message M22 in FIG. 15), the CPU 31 posts the candidate priority selection menu (see the message M24 in FIG. 15) to the talk room.

The candidate priority selection menu is a menu that causes the requester to select a method of setting the priority of the candidates, and includes, for example, two options, "random" and "user selected".

The requester selects one of the candidates' priority selection menus and responds to the chatbot selection instruction.

When the requester selects "user selected", the CPU 31 posts the priority candidate proxy list illustrated in the message M30A of FIG. 12 to the talk room, and asks the requester to set the priority of the candidate who is requested to perform proxy printing.

When the requester selects "random" for the candidate priority selection menu, the CPU 31 randomly sets the priority for each candidate included in the group selected by the requester from the candidate group list regardless of the requester's intention.

Then, the CPU 31 posts a priority setting message (see the message M30B in FIG. 15) to the talk room.

The priority setting message is information that informs the requester of the priority set by the CPU 31 for each candidate, and a number indicating the priority is displayed next to the user name.

Since the CPU 31 sets the priority of the candidate, the requester does not need to set the priority of the candidate.

Here, descriptions have been made on an example in which the CPU 31 sets the priority for the candidates narrowed down to the group unit in the candidate group list. However, the CPU 31 may set the priority for each candidate included in the candidate proxy list without narrowing down to the group unit in the candidate group list.

Further, the CPU 31 may set the priority of the candidate based on the statistical value regarding the proxy, instead of setting the priority of the candidate in a disorderly manner. The statistical value regarding the proxy is a statistical value indicating the degree to which the candidate acts as a proxy, and includes, for example, the number of acceptances for each candidate who has consented to act as a proxy, the number of acceptances for each user who has consented to act as a proxy, and for each time zone.

The CPU 31 may set a higher priority in order from, for example, the candidate having the highest number of acceptances to act as a proxy based on the statistical value regarding the proxy or set a higher priority in order from the candidate who has the highest number of acceptances to act as a proxy in the time zone for requesting proxy printing (e.g., the time zone in units of one hour).

Further, when the upper limit of the number of prints that may be printed by the printer 40 is set for each candidate, the highest priority may be set in order from the candidate with the largest number of remaining printable sheets.

In the proxy printing process corresponding to the talk room illustrated in FIG. 15, when all the candidates included in the group selected by the requester reject the proxy printing request, the requester reselects a new group from the candidate group list each time.

Therefore, in the same way that the requester has set the priority of the candidate in advance in the priority candidate proxy list, the requester may set the priority of the group requesting proxy printing in advance.

Figure 16:
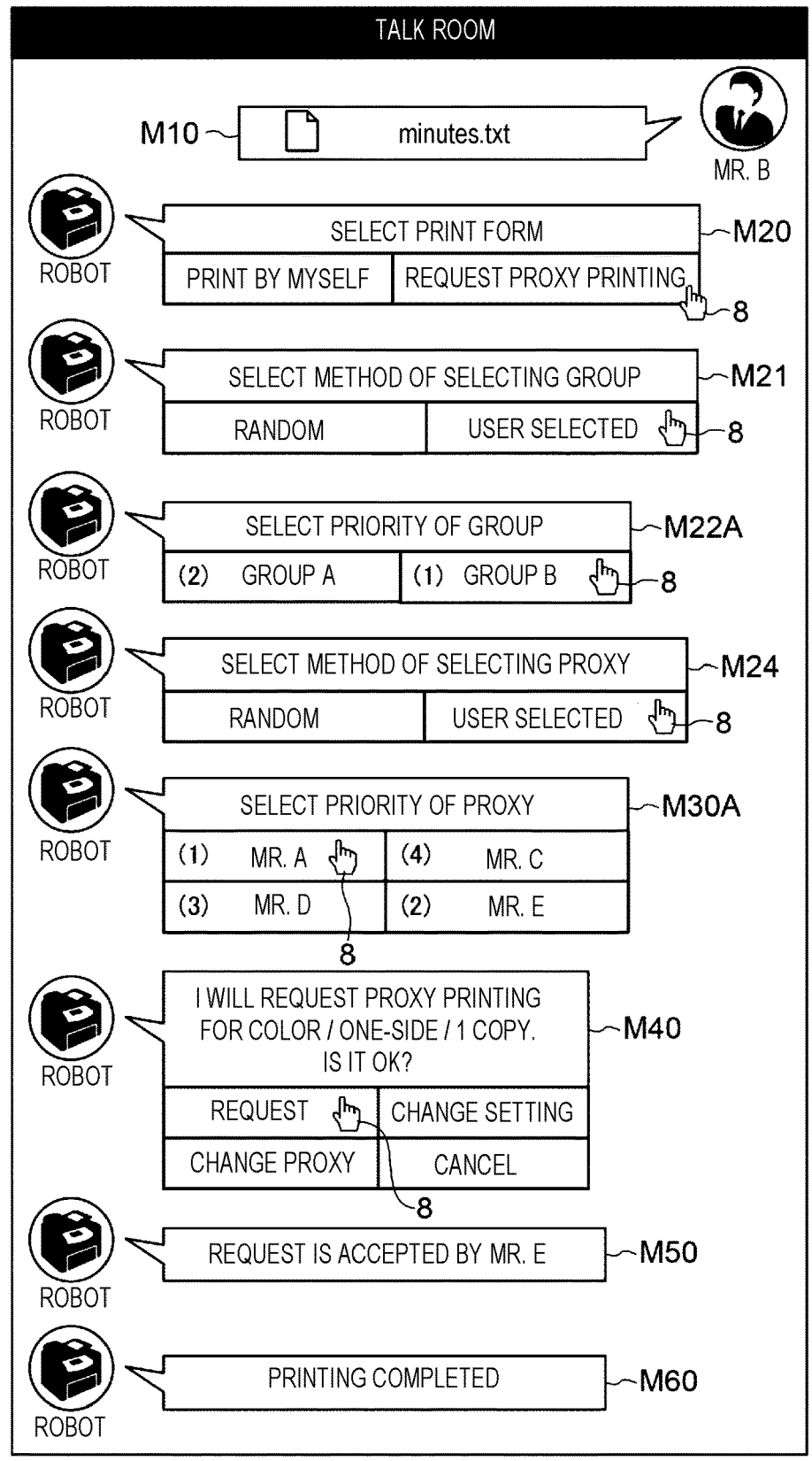
FIG. 16 is a diagram illustrating an example of a talk room when the proxy printing process according to the first exemplary embodiment using the priority candidate group list is performed.

For example, instead of the candidate group list represented in the message M22 of FIG. 14, a candidate group list as represented in the message M22A of FIG. 16 may be posted to the talk room.

The candidate group list (referred to as a "priority candidate group list") of FIG. 16 prompts the requester to set the request order of the group requesting proxy printing, that is, the priority of the group.

As a result, the CPU 31 first requests the candidate belonging to the group having the highest priority (group B in the example of FIG. 16) for proxy printing. When the request is rejected by all the candidates in the group, the CPU 31 requests the candidate belonging to the group having the next highest priority (group A in the example of FIG. 16) for proxy printing without having the requester select the next group. In this way, the CPU 31 selects the groups according to the priority of each group predetermined by the requester, and posts the request message to the individual talk room of the candidate and the chatbot belonging to the selected group until any candidate belonging to any of the groups included in the priority candidate group list accepts the request for proxy printing.

As represented in the posting of the candidate priority selection menu (see the message M24 in FIG. 15) regarding the candidate priority setting method in the talk room illustrated in FIG. 15, the CPU 31 may post a group priority selection menu (see the message M21 in FIG. 16) relating to a method of setting the group priority to the talk room.

The group priority selection menu is a menu that causes the requester to select a method of setting the priority of the group, and includes, for example, two options, "random" and "user selected".

The requester selects one of the options in the group priority selection menu and responds to the chatbot selection instruction.

When the requester selects "user selected", the CPU 31 posts the priority candidate group list represented in the message M22A of FIG. 16 to the talk room, and causes the requester to set the priority of the group requesting proxy printing.

Meanwhile, when the requester selects "random" for the group priority selection menu, the CPU 31 randomly sets priorities for each of the groups which are included in the group information 6 illustrated in FIG. 13 and to which the requester belongs, regardless of the intention of the requester.

In either case, the CPU 31 selects the groups in order from the group with the highest priority, and each time a group is selected, newly generates a candidate proxy list or a priority candidate proxy list that adopts users belonging to the selected group as candidates.

When setting the priority of the group, the CPU 31 may set the priority of the group based on the statistical value regarding the group instead of setting the priority of the group in a disorderly manner. The statistical value regarding the group is a statistical value indicating the degree to which the users in the group act as the proxy for each group, and includes, for example, the total number of users for each group acting as the proxy.

When the CPU 31 acquires the group information 6 from the talk room server 20, in order to improve the information security performance depending on the settings of the talk room server 20, only the group information 6 of the group to which the chatbot controlled by the CPU 31 belongs may be acquired. In such a case, the CPU 31 may acquire the group information 6 of the group to which the requester and the chatbot belong from the talk room server 20 among the groups to which the requester belongs, and include the group included in the acquired group information 6 in the candidate group list or the priority candidate group list.

Second Exemplary Embodiment

In the first exemplary embodiment, descriptions have been made on an example in which the requester requests proxy printing in an individual talk room in which the requester and the chatbot participate. However, in the second exemplary embodiment, descriptions will be made on a proxy printing process when the requester requests proxy printing in a group talk room in which the requester, plural other users, and a chatbot participate.

Figure 17:
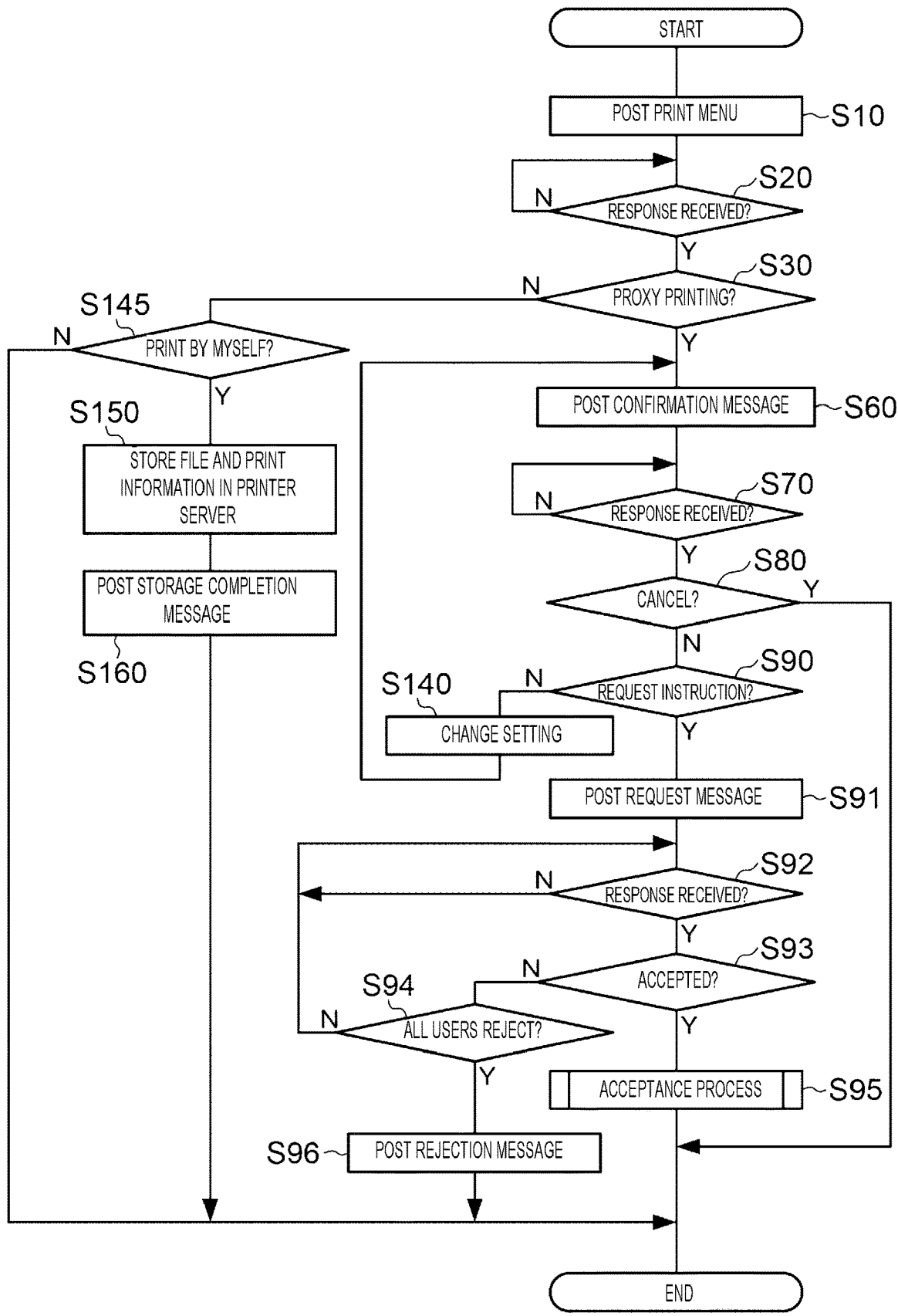
FIG. 17 is a flowchart illustrating an example of the flow of the proxy printing process according to a second exemplary embodiment.
Figure 18:
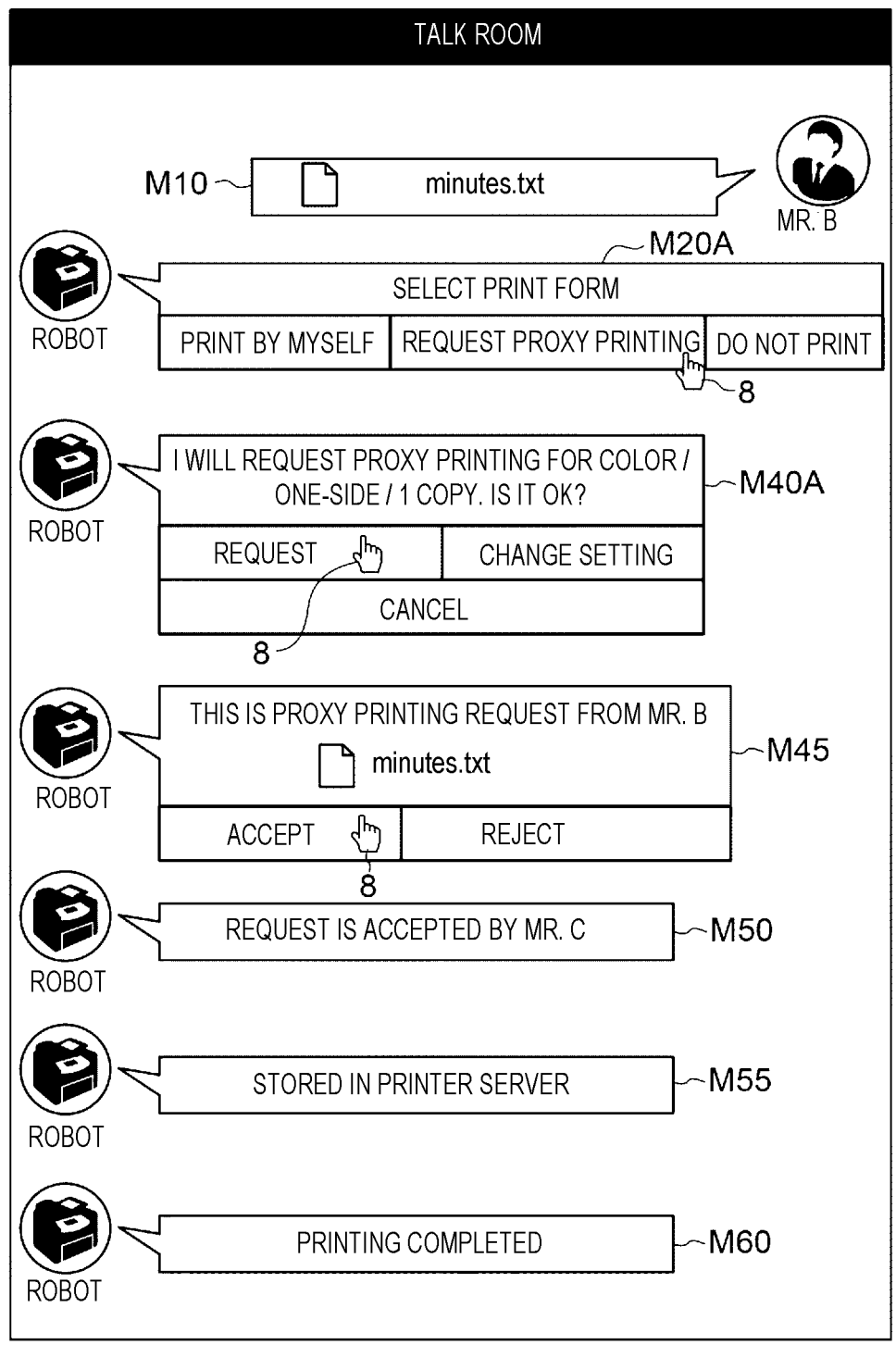
FIG. 18 is a diagram illustrating an example of a talk room when the proxy printing process according to the second exemplary embodiment is performed.

FIG. 17 is a flowchart illustrating an example of the flow of proxy printing process executed by the CPU 31 when a file which is an example of print data is posted to the group talk room in which the chatbot server 30 participates through the chatbot. Further, FIG. 18 is a diagram illustrating an example of a talk room displayed on the user terminal 10 of the requester who posts the file by the proxy printing process illustrated in FIG. 17. It is assumed that the initial registration of each user participating in the group talk room and the chatbot has already been completed.

The proxy printing process illustrated in FIG. 17 is different from the proxy printing process according to the first exemplary embodiment illustrated in FIG. 5 (referred to as a "proxy printing process in individual talk room") in that step S145 is added instead of the deletion of steps S40 and S50, and the process after the negative determination made in the determination process of step S80 is changed.

Hereinafter, the proxy printing process according to the present exemplary embodiment will be described, focusing on the differences from the proxy printing process in the individual talk room. The group talk room where the requester posts a file that is an example of print data is hereinafter simply referred to as the "group talk room".

When the requester's response to the print menu (see the message M20A in FIG. 18) is not a response corresponding to the proxy printing request by the determination process in step S30, the process proceeds to step S145.

When the requester posts a file in the individual talk room of the requester and the chatbot, the requester requests the chatbot to either perform a proxy printing of the file or perform a normal printing thereof. However, when the requester posts a file to the group talk room, in addition to the request for proxy printing of the file and the request for normal printing of the file, it is also conceivable that the file is posted for the purpose of sharing with other users participating in the group talk room. Therefore, the print menu posted to the group talk room by the CPU 31 includes the option of "do not print" in addition to the options of "print by myself" and "request proxy printing".

In step S145, the CPU 31 determines whether the requester's response to the print menu is a response corresponding to the normal printing request received when the requester selects "print by myself" in order to determine whether the requester has selected the option of "print by myself" or "do not print" in the print menu. When it is determined that the received response is a response corresponding to the request for normal printing, the process proceeds to step S150, and the CPU 31 executes the normal printing already described in steps S150 and S160.

Further, when it is determined that the received response is not the response corresponding to the normal printing request, it is not necessary to print the file, so the proxy printing process illustrated in FIG. 17 is ended.

Meanwhile, when the requester's response to the print menu is a response corresponding to the proxy printing request by the determination process in step S30, the process proceeds to step S60.

In the proxy printing process in the individual talk room, the candidate proxy list is posted to the individual talk room and the requester is asked to select the candidate (see step S40 in FIG. 5 and the message M30 in FIG. 6). However, the CPU 31 posts a confirmation message (see the message M40A in FIG. 18) to the group talk room in step S60 without having the requester select a candidate.

Instead of posting various messages such as confirmation messages to the group talk room, the CPU 31 may notify various messages by using a mention function of notifying the message to a designated party. For example, in the case of the confirmation message in step S60, the CPU 31 may use the mention function after setting a notification destination of the confirmation message as the requester. A method of designating the other party to whom the message is notified in the mention function follows the specifications defined by the talk room server 20 that provides the talk room. For example, the person to whom the message is notified is designated by the notation format of "@chat user ID" in which "@" is added before the chat user ID.

The confirmation message represented by the message M40A in FIG. 18 is different from the confirmation message of the proxy printing process in the individual talk room (see the message M40 in FIG. 6) in that since the requester is not caused to select a candidate, unlike the message M40 in FIG. 6, the candidate name such as "I will request proxy printing to Mr. A" is not displayed, and there is no option of "change proxy".

When the requester selects "change setting" in the confirmation message, the determination process in step S90 becomes a negative determination. Thus, the attribute value of the print attribute for the printer 40 is changed in step S140, and the process proceeds to step S60.

When the requester selects "request" in the confirmation message, the determination process in step S90 becomes an affirmative determination, and the process proceeds to step S91.

In this case, the CPU 31 sets all the other users participating in the group talk room as candidates. Therefore, in step S91, the CPU 31 posts a request message (see the message M45 in FIG. 18) requesting proxy printing to the group talk room. As a result, the request message is notified to all the other users participating in the group talk room.

When another user participating in the group talk room confirms the request message on each user terminal 10, each of the other users responds to the chatbot's selection instructions by selecting the "accept" or "reject" option of the request message.

In step S92, the CPU 31 determines whether the response of any other user to the request message has been received. When it is determined that no response has been received, the determination process of step S92 is repeatedly executed to monitor the presence or absence of a response. When it is determined that any response has been received, the process proceeds to step S93.

In step S93, the CPU 31 determines whether the received response is a response corresponding to the acceptance. When it is determined that the received response is not a response corresponding to the acceptance, that is, when any other user selects "reject" for the request message, the process proceeds to step S94. Further, the CPU 31 may know from which user the response has been received through the chatbot.

In step S94, the CPU 31 determines whether all the other users participating in the group talk room except the requester and the chatbot have rejected the proxy printing request. When it is determined that all the other users have not rejected the request, the process proceeds to step S92, and the presence or absence of a response from another user who has not yet selected the request message option is monitored.

Meanwhile, when it is determined in the determination process of step S94 that all the other users have rejected the request, the process proceeds to step S96.

In step S96, the CPU 31 posts a rejection message indicating that all the other users participating in the group talk room have rejected the proxy printing request to the group talk room, and ends the proxy printing process illustrated in FIG. 17. This allows the requester to know through the chatbot that all other users participating in the group talk room have rejected the proxy printing request. In this case, the requester may select another group or an individual user to request the proxy printing. For the selection of the group or individual user, it is possible to apply the selection using the candidate proxy list, the priority candidate proxy list, the candidate group list, and the priority candidate group list described in the first exemplary embodiment and modifications 1 and 2 thereof.

Meanwhile, when it is determined that the response received in the determination process of step S93 is a response corresponding to the acceptance, the process proceeds to step S95, and the CPU 31 executes the acceptance process.

Figures 19, 20:
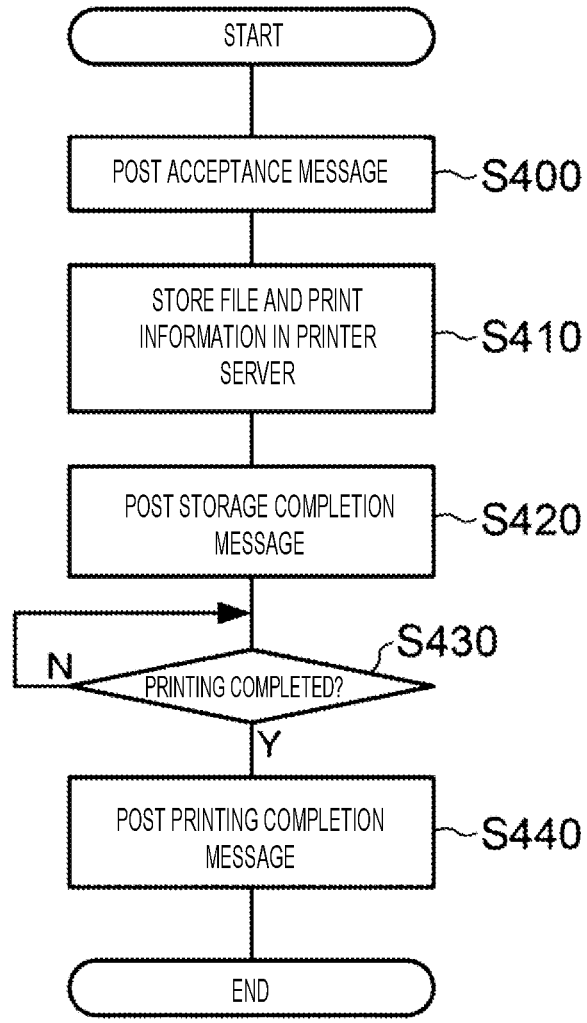
FIG. 19 is a flowchart illustrating an example of the flow of an acceptance process in the proxy printing process according to the second exemplary embodiment.
FIG. 20 is a diagram illustrating another example of print information.

FIG. 19 is a flowchart illustrating an example of the flow of acceptance process.

First, in step S400 of FIG. 19, the CPU 31 posts an acceptance message (see the message M50 of FIG. 18) to the group talk room informing the requester that any user has accepted proxy printing as a proxy. The CPU 31 may include the user name of the user who has accepted the request for proxy printing, that is, the user name of the proxy, in the acceptance message.

In step S410, the CPU 31 generates print information 4 in which the file posted in the group talk room by the requester is associated with the print user ID of the proxy and the print settings confirmed by the requester by the confirmation message. For example, when Mr. C accepts acting as a proxy, the CPU 31 sets the print user ID included in the print information 4 to "FX03", which is the print user ID of Mr. C (see, e.g., FIG. 20).

Then, the CPU 31 outputs the file and the generated print information 4 to the printer server 60, and stores the file and the print information 4 in the printer server 60.

Along with this, in step S420, the CPU 31 posts a storage completion message (see the message M55 in FIG. 18) to the group talk room.

By the storage complete message, the proxy confirms that the file is ready for printing. After confirming that the file is ready to be printed, the proxy moves to the printer 40, inputs the proxy's own print user ID (in this case, "FX03") to the printer 40, and receives a recording medium on which the contents of the file are printed on the printer 40 on behalf of the requester.

When the file is printed by the printer 40, the printer server 60 sends a response to the chatbot server 30 notifying that the printing of the file is completed.

Therefore, in step S430, the CPU 31 determines whether the response notifying that the printing of the file is completed has been received. When it is determined that such a response has not been received, the determination process of step S430 is repeatedly executed to monitor the presence or absence of a response. When it is determined that such a response has been received, the process proceeds to step S440.

In response to the completion of printing the file, in step S440, the CPU 31 posts a completion message (see the message M60 in FIG. 18) notifying the requester that the proxy printing is completed to the group talk room, and ends the acceptance process illustrated in FIG. 19.

As described above, according to the proxy printing process according to the second exemplary embodiment, since each of the other users participating in the group talk room becomes a candidate, the requester may omit the operation of selecting the candidate. When the initial registration of the candidate and the chatbot is not completed, the CPU 31 performs the initial registration process illustrated in FIG. 10 with the candidate and then exchanges messages.

In the proxy printing process illustrated in FIG. 17, as illustrated in the group talk room illustrated in FIG. 18, in the middle of a conversation between users using a message, a confirmation message is posted in which the chatbot asks the requester to confirm the print settings of the file, and a request message is posted to request other users who participate in the group talk room to print on behalf of the user. Thus, in certain situations, it may be difficult to tell who the posted message is for.

Therefore, the CPU 31 may post various menus and messages to individual talk rooms with users who want to see the messages.

For example, the CPU 31 posts the confirmation message represented in the message M40A of FIG. 18 to the individual talk room between the chatbot and the requester, and posts the request message represented in the message M45 of FIG. 18 to the individual talk room between the chatbot and the other user for each of the other users. Further, the CPU 31 posts the acceptance message represented in the message M50 of FIG. 18 to the individual talk room between the chatbot and the requester, and posts the storage completion message represented in the message M55 of FIG. 18 to the individual talk room between the chatbot and the proxy. When the proxy printing by the proxy is completed, the CPU 31 posts the completion message represented in the message M60 of FIG. 18 to the individual talk room between the chatbot and the requester. Surely, the print menu represented in the message M20A of FIG. 18 may be posted in the individual talk room between the chatbot and the requester.

In this case, the print menu, confirmation message, request message, acceptance message, storage completion message, and completion message are not posted to the group talk room of FIG. 18. Therefore, the flow of conversations between users in the group talk room is easier to understand than when these menus and messages, and conversations between users are mixed and posted to the group talk room.

Further, in the proxy printing process according to the second exemplary embodiment, the request message is posted to each of the users other than the requester who participates in the group talk room all at once, and the candidate who accepts the proxy printing earliest is used as the proxy. However, as described in modification 1 of the first exemplary embodiment, the CPU 31 may post the priority candidate proxy list to the group talk room and have the requester set the priority for users other than the requester who participates in the group talk room, that is, the candidate for proxy printing.

Figure 21:
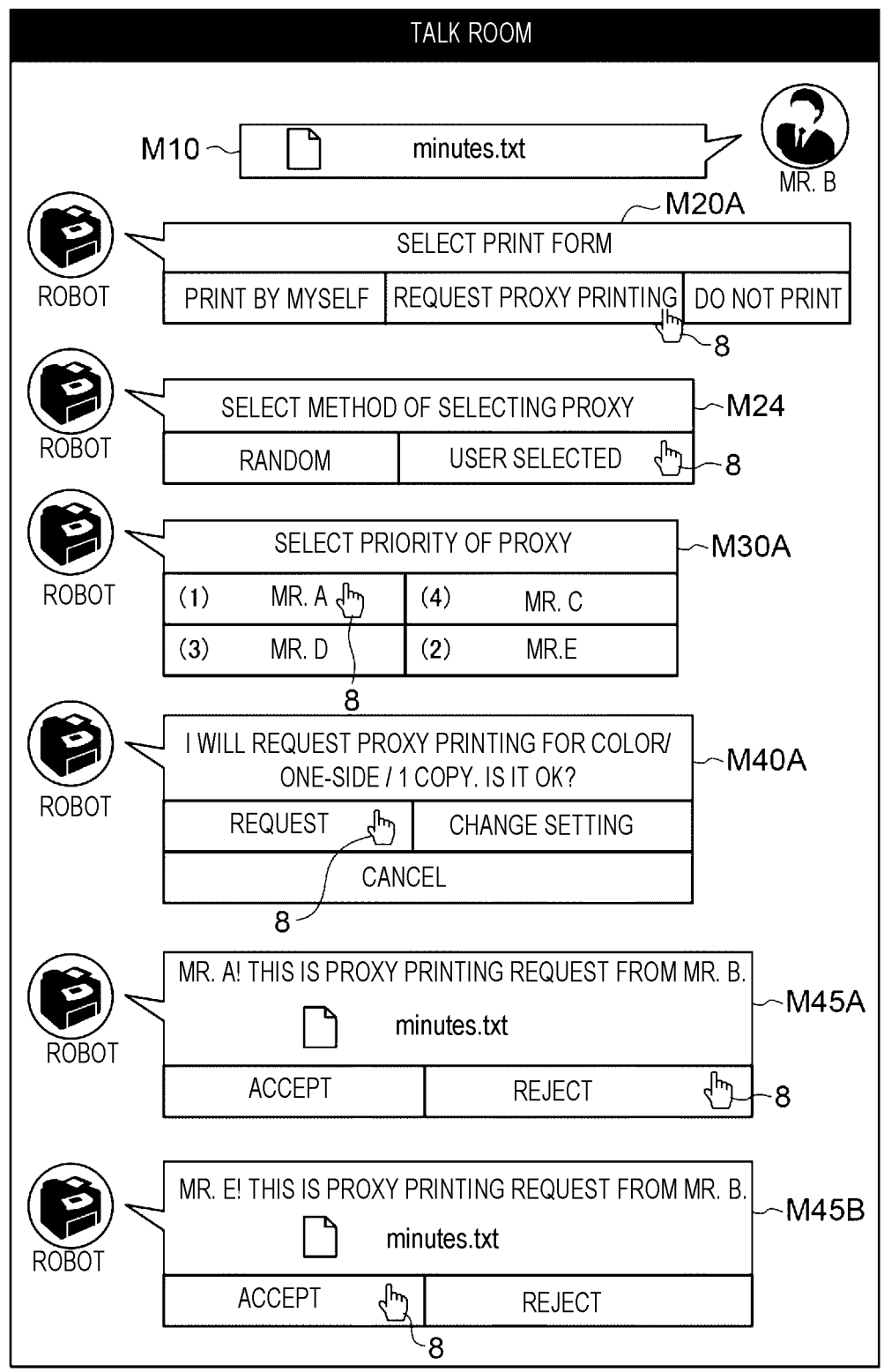
FIG. 21 is a diagram illustrating an example of a talk room when the proxy printing process according to the second exemplary embodiment is performed using the priority candidate proxy list.

FIG. 21 is a diagram illustrating an example of a group talk room displayed on the user terminal 10 of the requester who posts the file when the priority of the candidate is set using the priority candidate proxy list.

When it is determined in the determination process of step S30 of FIG. 17 that the requester's response to the print menu is a response corresponding to the request for proxy printing, the CPU 31 posts the candidate priority selection menu (see the message M24 in FIG. 21) to the group talk room before posting the confirmation message in step S60.

When the requester selects "user selected" for the priority selection menu, the CPU 31 posts a candidate proxy list (see the message M30A in FIG. 21) prompting the requester to set the priority of the candidates to the group talk room.

In this case, since the priority of the candidates is set by the requester, in step S91 of FIG. 17, the CPU 31 posts a request message for requesting proxy printing to a candidate having the highest priority ("Mr. A" in the example of FIG. 21) as represented in the message M45A of FIG. 21 to the group talk room, instead of the request message represented in the message M45 of FIG. 18.

When the candidate who is requested to perform proxy printing in the request message rejects the request, the request message (see the message M45B in FIG. 21) addressed to the user with the next highest priority ("Mr. E" in the example of FIG. 21) is posted to the group talk room.

In this way, the CPU 31 may clarify to whom the request message is addressed. Further, when the requester selects "random" for the priority selection menu represented in the message M24 of FIG. 21, the CPU 31 sequentially posts a request message for one specific candidate to the group talk room until any candidate, who is the target of the request, accepts the proxy according to the priority set in a disorderly manner for each of the users other than the requester who participates in the group talk room.

Surely, the priority selection menu and the candidate proxy list may be posted in the individual talk rooms of the chatbot and the requester as in the print menu.

When there are plural printers 40, the CPU 31 may instruct the printer server 60 which printer 40 to output the print object containing the contents of the file to be printed, and control so that the proxy cannot receive the print object except for the instructed printer 40. In this case, the CPU 31 notifies the proxy, by a storage completion message, about which printer 40 receives the print object.

Specifically, the CPU 31 selects the printer 40 that outputs the print object by referring to the printer selection information stored in the storage 34 in advance. The printer selection information is information that defines selection conditions for the printer 40, and is an example of predetermined conditions for outputting a print object.

For example, when the selection condition that gives priority to shortening the moving distance of the proxy is set in the printer selection information, the CPU 31 controls the printer server 60 so that the printer 40 installed at the closest distance to the proxy outputs the print object.

Further, when the selection condition for giving priority to shortening the waiting time in the printer 40 is set in the printer selection information, the CPU 31 controls the printer server 60 so that among the plural printers 40, the printer 40 that is not forming an image for another user outputs the print object. In this case, the CPU 31 may control the printer server 60 so that the printer 40, which has the least amount of print data waiting to be printed by the printer 40, outputs the print object.

Although an aspect of the chatbot server 30 in the information communication system has been described above using the exemplary embodiment, the disclosed form of the chatbot server 30 is an example, and the form of the chatbot server 30 is not limited to the scope described in the exemplary embodiment. Various changes or improvements may be made to the exemplary embodiments without departing from the gist of the present disclosure, and the modified or improved forms are also included in the technical scope of the disclosure. For example, the order of the proxy printing processes illustrated in FIGS. 5 and 17 may be changed without departing from the gist of the present disclosure.

Further, in the above-described exemplary embodiment, a mode in which the proxy printing process is implemented by software has been described as an example. However, the same process as the flowcharts illustrated in FIGS. 5 and 17 may be processed by hardware. In this case, the processing speed may be increased as compared with the case where the proxy printing process is implemented by software.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, an example in which the information processing program is stored in the ROM 32 has been described, but the storage destination of the information processing program is not limited to the ROM 32. The information processing program of the present disclosure may also be provided in a form recorded on a storage medium that is readable by the chatbot server 30. For example, the information processing program may be provided in the form of being recorded on an optical disc such as a compact disk read only memory (CD-ROM) and a digital versatile disk only memory (DVD-ROM). Further, the information processing program may be provided in a form of being recorded in a portable semiconductor memory such as a universal serial bus (USB) memory and a memory card. The ROM 32, the storage 34, CD-ROM, DVD-ROM, USB, and memory card are examples of non-transitory storage media.

Further, the chatbot server 30 may download an information processing program from an external device (not illustrated) connected to the communication line through the communication I/F 37, and store the downloaded information processing program in the storage device. In this case, the CPU 31 of the chatbot server 30 reads the information processing program downloaded from an external device (not illustrated) from the storage device and executes the proxy printing process.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
when a chatbot controlled by the processor receives a request for proxy printing of a print object posted in a first talk room by a first user serving as a requester, post request information requesting the proxy printing of the print object through a second talk room to a second user serving as a proxy, the first user different from the second user; and
output the print object to an image forming apparatus as a print object of the second user who accepts the proxy printing of the print object through the second talk room to which the request information is posted.

2. The information processing apparatus according to claim 1, wherein the processor is configured to:
post a candidate proxy list including a candidate for the second user who is requested to perform the proxy printing of the print object to the first talk room; and
post the request information to an individual talk room between a candidate selected by the first user from the candidate proxy list and the chatbot.

3. The information processing apparatus according to claim 2, wherein the processor is configured to:
post the candidate proxy list including a user registered in advance as a communication partner with the chatbot to the first talk room.

4. The information processing apparatus according to claim 2, wherein the processor is configured to:
post a candidate group list including groups to which the first user belongs to the first talk room, generate the candidate proxy list including users other than first user belonging to the group selected by the first user from the candidate group list, and post the candidate proxy list to the first talk room; and
post the request information to the individual talk room in which the candidate selected by the first user from the candidate proxy list participates.

5. The information processing apparatus according to claim 4, wherein the processor is configured to:
include only a group to which the first user and the chatbot belong, among the groups to which the first user belongs, in the candidate group list.

6. The information processing apparatus according to claim 4, wherein the processor is configured to:
when all candidates included in the group selected by the first user do not accept the proxy printing of the print object, select a group according to a request order of each group preset for the candidate group list, newly generate a candidate proxy list for the selected group, and post the newly generated candidate proxy list to the first talk room.

7. The information processing apparatus according to claim 5, wherein the processor is configured to:
when all candidates included in the group selected by the first user do not accept the proxy printing of the print object, select a group according to a request order of each group preset for the candidate group list, newly generate a candidate proxy list for the selected group, and post the newly generated candidate proxy list to the first talk room.

8. The information processing apparatus according to claim 2, wherein the processor is configured to:
when a candidate selected by the first user does not accept the proxy printing of the print object, select a candidate for the proxy according to a request order of each candidate preset for the candidate proxy list, and request the proxy printing of the print object through the second talk room.

9. The information processing apparatus according to claim 3, wherein the processor is configured to:
when a candidate selected by the first user does not accept the proxy printing of the print object, select a candidate for the proxy according to a request order of each candidate preset for the candidate proxy list, and request the proxy printing of the print object through the second talk room.

10. The information processing apparatus according to claim 4, wherein the processor is configured to:
when a candidate selected by the first user does not accept the proxy printing of the print object, select a candidate for the proxy according to a request order of each candidate preset for the candidate proxy list, and request the proxy printing of the print object through the second talk room.

11. The information processing apparatus according to claim 5, wherein the processor is configured to:
when a candidate selected by the first user does not accept the proxy printing of the print object, select a candidate for the proxy according to a request order of each candidate preset for the candidate proxy list, and request the proxy printing of the print object through the second talk room.

12. The information processing apparatus according to claim 1, wherein the processor is configured to:
when a group chat is performed in a talk room in which the first user participates, request another one of users participating in the group chat to perform the proxy printing of the print object.

13. The information processing apparatus according to claim 12, wherein the processor is configured to:
post the request information to a talk room in which the group chat is performed.

14. The information processing apparatus according to claim 12, wherein the processor is configured to:
post the request information to an individual talk room between the chatbot and any one of the other users.

15. The information processing apparatus according to claim 1, wherein the processor is configured to:
when first identification information for identifying a user in a talk room is initially registered in a storage device for each of users communicating with the chatbot, acquire second identification information for identifying each of the users by the image forming apparatus from each of the users, and associate the first identification information with the second identification information.

16. The information processing apparatus according to claim 1, wherein the processor is configured to:
when the image forming apparatus is provided in plurality, select the image forming apparatus to which the print object is output according to a predetermined condition regarding the output of the print object.

17. The information processing apparatus according to claim 16, wherein the processor is configured to:
output the print object to the image forming apparatus closest to the proxy.

18. A non-transitory computer readable medium storing a program causing a computer to execute information processing, the information processing comprising:
when a chatbot controlled receives a request for proxy printing of a print object posted in a first talk room by a first user serving as a requester, posting request information requesting the proxy printing of the print object through a second talk room to a second user serving as a proxy, the first user different from the second user;
and
outputting the print object to an image forming apparatus as a print object of the second user who accepts the proxy printing of the print object through the second talk room to which the request information is posted.

19. An information processing method comprising:
when a chatbot controlled receives a request for proxy printing of a print object posted in a first talk room by a first user serving as a requester, posting request information requesting the proxy printing of the print object through a second talk room to a second user serving as a proxy, the first user different from the second user; and
outputting the print object to an image forming apparatus as a print object of the second user who accepts the proxy printing of the print object through the second talk room to which the request information is posted.

20. The information processing apparatus according to claim 1, wherein the first talk room is different from the second talk room.

* * * * *